United States Patent
Moratalla

(10) Patent No.: US 6,361,588 B1
(45) Date of Patent: Mar. 26, 2002

(54) SELECTIVE PERMEABILITY ENERGY RECOVERY DEVICE

(76) Inventor: Jose Moratalla, 11601 56th Ct., Clearwater, FL (US) 33760

(*) Notice: Subject to any disclaimer, the term of this patent is extended or adjusted under 35 U.S.C. 154(b) by 0 days.

(21) Appl. No.: 09/469,592

(22) Filed: Dec. 22, 1999

(51) Int. Cl.⁷ ........................ B01D 53/22; B01D 53/26
(52) U.S. Cl. ............... 96/4; 96/14; 96/154; 55/521; 55/528
(58) Field of Search ................ 95/52; 96/4, 7, 96/9–14, 125, 154; 55/521, 523, 528, DIG. 5

(56) References Cited

U.S. PATENT DOCUMENTS

| | | | |
|---|---|---|---|
| 2,618,357 A | * 11/1952 | Harlow | 96/7 |
| 3,666,007 A | * 5/1972 | Yoshino | 165/166 |
| 3,713,281 A | * 1/1973 | Asker et al. | 95/154 |
| 4,051,898 A | * 10/1977 | Yoshino et al. | 165/166 |
| 4,377,400 A | * 3/1983 | Okamoto et al. | 96/13 |
| 4,391,616 A | * 7/1983 | Imamura | 96/125 X |
| 4,449,992 A | * 5/1984 | Yamada et al. | 96/7 |
| 4,497,361 A | * 2/1985 | Hajicek | 96/125 |
| 4,574,872 A | * 3/1986 | Yano et al. | 96/125 |
| 4,582,129 A | * 4/1986 | Yano et al. | 165/97 |
| 4,594,860 A | * 6/1986 | Coellner et al. | 96/125 X |
| 4,756,835 A | * 7/1988 | Wilson | 96/9 X |
| 4,769,053 A | * 9/1988 | Fischer et al. | 96/125 |
| 4,909,810 A | * 3/1990 | Nakao et al. | 95/52 |
| 5,435,958 A | * 7/1995 | Dinnage et al. | 96/154 X |
| 5,653,115 A | * 8/1997 | Brickley et al. | 62/94 |
| 5,733,451 A | * 3/1998 | Coellner et al. | 96/125 X |
| 6,036,746 A | * 3/2000 | Scovazzo et al. | 95/52 |
| 6,048,383 A | * 4/2000 | Breault et al. | 96/7 X |
| 6,083,300 A | * 7/2000 | McFadden | 96/125 X |
| 6,171,374 B1 | * 1/2001 | Barton et al. | 95/52 X |

FOREIGN PATENT DOCUMENTS

| | | | | |
|---|---|---|---|---|
| JP | 02-241514 A | * | 9/1990 | 95/52 |

* cited by examiner

Primary Examiner—Robert H. Spitzer

(57) ABSTRACT

A property transfer assembly for transferring properties from a first flowing fluid to a second flowing fluid comprising a plurality of spacer components in a stacked relationship including at least one first spacer component defining a first path of travel for the first flow and at least one second spacer component defining a second path of travel for the second flow, the first and second spacer components being separated in a spaced relationship; and a transfer sheet located between the spacer components and adapted to transfer heat therethrough from the warmer to the cooler flow and to transfer moisture therethrough from the moister to the drier fluid.

22 Claims, 23 Drawing Sheets

PRIOR ART

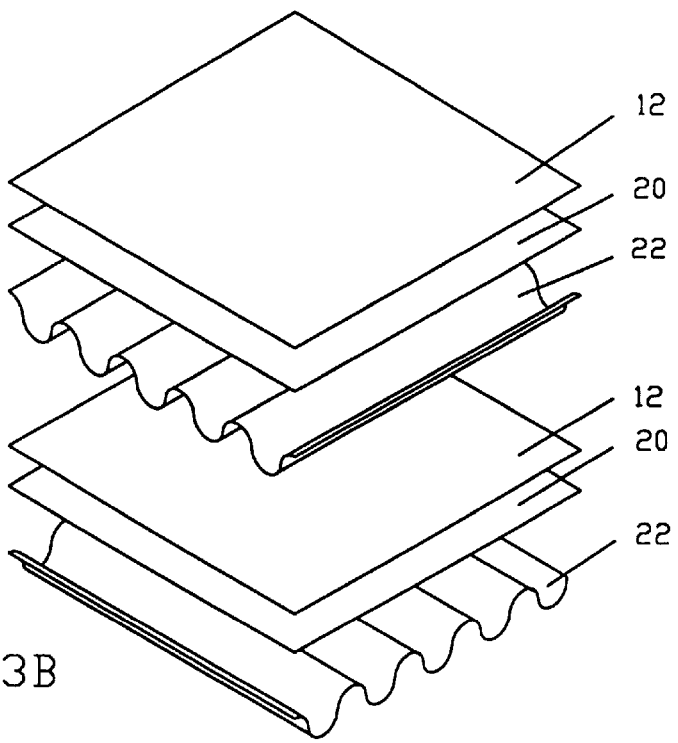
FIG. 3B
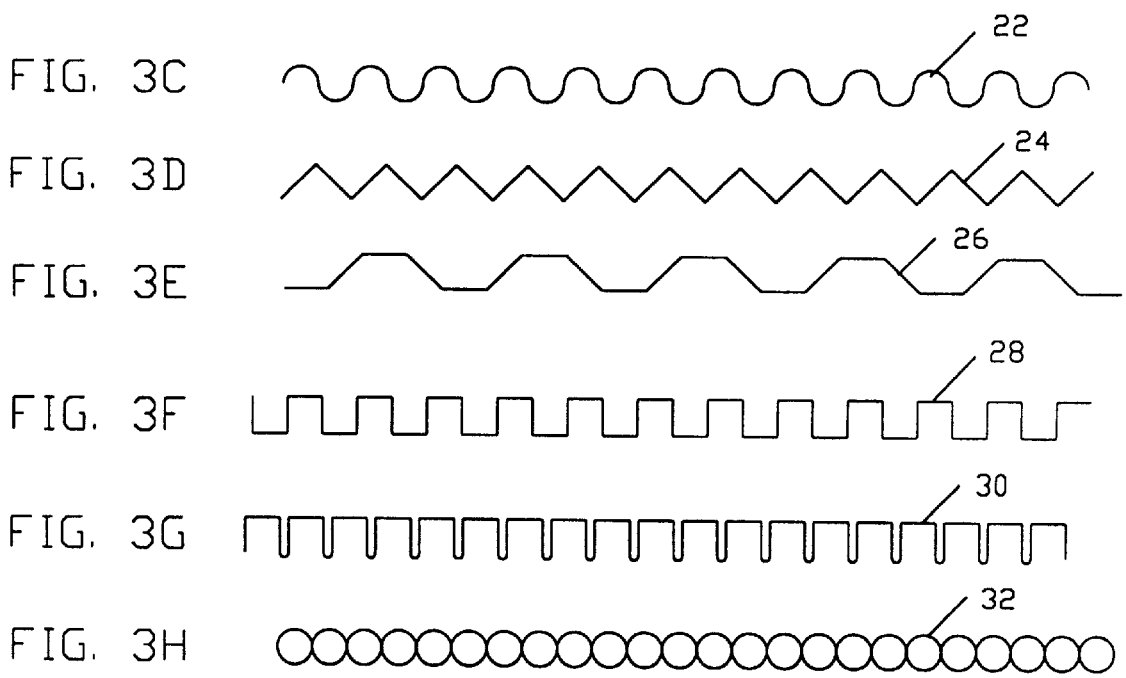
FIG. 3C
FIG. 3D
FIG. 3E
FIG. 3F
FIG. 3G
FIG. 3H

FIG. 3J
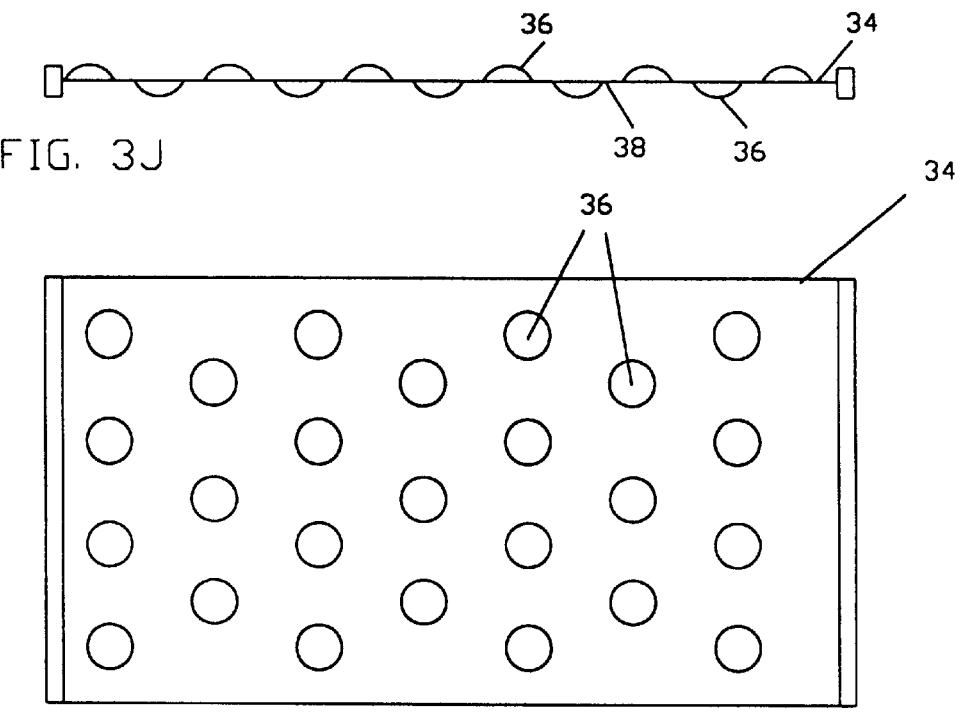
FIG. 3K
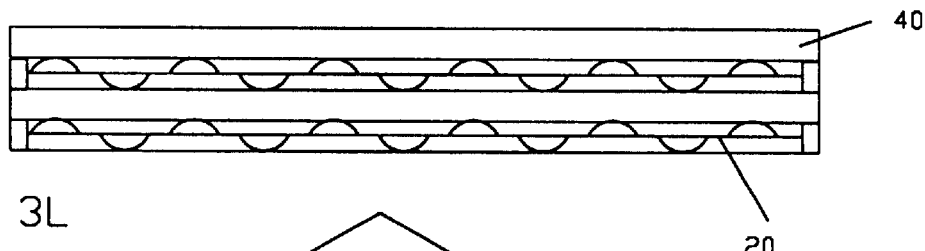
FIG. 3L
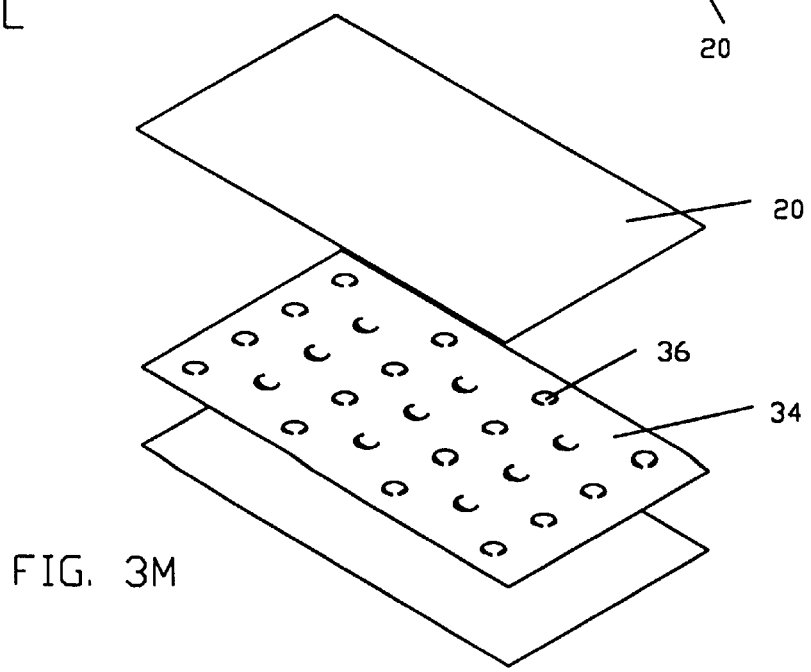
FIG. 3M

SELECTIVE PERMEABILITY ENERGY RECOVERY DEVICE

BACKGROUND OF THE INVENTION

1. Field of the Invention

The present invention relates to a selective permeability energy recovery device and more particularly pertains to selectively transferring thermal and/or humidity properties from a first warmer and/or moister flowing fluid to a cooler and/or drier second flowing fluid with no contaminants being transferred.

2. Description of the Prior Art

The basis of the present invention relates to the transfer properties between two different flows of fluids of different properties. The properties of temperature and content of water will try to reach an equilibrium between two different fluid flows. The present invention allows for the transfer of total energy, all energy consumed for any thermal process. Total energy includes sensible energy and latent energy. Sensible energy relates to temperature only. Latent energy relates to humidity. The particular property of the unique design of the present invention is called selectivity, the membranes or skins are used as primary embodiments and have the properties to absorb, diffuse and desorb water vapor, and because of its thickness makes it very efficient in the transferring of heat from one side to the other. The selectivity, a function of the permeability of the material makes it possible to transfer water vapor and block the transfer between air flows of air, CO, $CO_2$, ammonia, propane, Freon, formaldehyde and other unwanted contaminants. This membrane or skin has very good flexibility and resistance to oils and aromatic solvents and also is highly resistant to a wide range of chemical agents. It has great vibration absorption properties.

The use of property transfer systems is known in the prior art. More specifically, transfer systems heretofore devised and utilized for the purpose of heat and/or humidity exchange of various designs and configurations are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,653,115 issued to Brickle et al., assigned to Munters Corporation, which relates to an Air-Conditioning System Using a Desiccant Core; U.S. Pat. No. 4,051,898 issued to Yoshino et al., assigned to Mitsubishi Denki Kabushiki Kaisha, which relates to a Static Heat-And-Moisture Exchanger; U.S. Pat. No. 3,666,007 issued to Yoshino et al., assigned to Mitsubishi Denki Kabushiki Kaisha, which relates to an Apparatus for Effecting Continuous and Simultaneous Transfer of Heat and Moisture Between Two Air Streams; and U.S. Pat. No. 4,582,129 issued to Yano et al., assigned to Matsuhita Electric Industrial Co., Ltd., which relates to a Heat Exchanging System.

In this respect, the transfer system according to the present invention substantially departs from the conventional concepts and designs of the prior art, and in so doing provides an apparatus primarily developed for the purpose of more efficiently transferring thermal and moisture properties from a warmer and/or moister first flowing fluid to a cooler and/or drier second flowing fluid while including selective permeability with respect to unwanted fluids.

Therefore, it can be appreciated that there exists a continuing need for a new and improved transfer system which can be used for transferring thermal and/or humidity properties from a warmer and/or moister first flowing fluid to a cooler and/or drier second flowing fluid. In this regard, the present invention substantially fulfills this need.

SUMMARY OF THE INVENTION

In view of the foregoing disadvantages inherent in the known types of heat exchangers of various designs and configurations now present in the prior art, the present invention provides an improved energy transfer/recovery system. As such, the general purpose of the present invention, which will be described subsequently in greater detail, is to provide a new and improved transfer system which has all the advantages of the prior art and none of the disadvantages.

To attain this, the present invention essentially comprises a new and improved transfer system for transferring thermal and moisture properties between a first flow of air and a second flow of air, the first and second flows of air having different thermal and moisture properties, the transfer system comprising, in combination, a plurality of spacer components in a stacked relationship including a plurality of first spacer components defining a first path of travel for the first flow and a plurality of second spacer components defining a second path of travel for the second flow, the first and second spacer components being stacked in an alternating relationship; a plurality of HYTREL or similar brand engineering thermoplastic elastomer located between each of the spacer components and adapted to transfer heat therethrough from the warmer to the cooler flow and to transfer moisture therethrough from the moister to the drier fluid by absorbing, diffusing and desorbing; and a desiccant layer on the heat exchanger media on a common side thereof. HYTREL is a trademark of E.I. duPont De Nemours & Company of Wilmington, Del., and relates to a thermoplastic elastomer formed as a membrane or sheet with absorptive capacity which diffuses fluid passing there through.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved transfer system which has all the advantages of the prior art transfer systems and none of the disadvantages.

It is a primary object of the present invention to provide a new and improved total energy heat exchanger which may be easily and efficiently manufactured and marketed.

It is a further object of the present invention to provide a new and improved selective permeability energy recovery device which is of a durable and reliable construction.

An even further object of the present invention is to provide a new and improved system for exchanging total energy which is susceptible of a low cost of manufacture with regard to both materials and labor, and which accordingly is then susceptible of low prices of sale to the consuming public, thereby making such property transfer system economically available to the buying public.

Still yet another object of the present invention is to provide a new and improved total energy heat exchanger which provides in the apparatuses and methods of the prior art some of the advantages thereof, while simultaneously overcoming some of the disadvantages normally associated therewith.

Still another object of the present invention is to transfer thermal and/or moisture properties from a warmer first flowing fluid to a cooler second flowing fluid.

Lastly, it is an object of the present invention to provide a new and improved property transfer assembly for transferring properties from a first flowing fluid to a second flowing fluid comprising a plurality of spacer components in a stacked relationship including at least one first spacer component defining a first path of travel for the first flow and at least one second spacer component defining a second path of travel for the second flow, the first and second spacer components being separated in a spaced relationship; and a transfer sheet located between the spacer components and adapted to transfer heat therethrough from the warmer to the cooler flow and to transfer moisture therethrough from the moister to the drier fluid.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1C (prior art) is similar to FIG. 1B but utilizing GORE-TEX as the transfer sheet with small holes there through.

FIG. 3B is an exploded perspective illustration similar to FIG. 3A but with a desiccant layer associated with each membrane transfer sheet, the transfer sheet being an absorptive membrane skin, or film, such as HYTREL or other similar material.

FIGS. 3C–3H illustrate alternate configurations for the spacer components, FIG. 3C being sinusoidal, FIG. 3D being triangular, FIG. 3E being trapezoidal, FIG. 3F being sawtooth, FIG. 3G being finger-shaped, and FIG. 3H being in the form of cylindrical tubes.

FIGS. 3J and 3K are a cross-sectional view and a plan view of a spacer component formed as spaced hemispheres integrally formed on opposite sides of a base region to constitute bumps on both sides of the sheets.

FIGS. 3L and 3M are a cross-sectional view and an exploded perspective view of a transfer assembly employing the spacer components shown in FIGS. 3J and 3K.

FIGS. 4G–4I are schematic illustrations of transfer systems employing the transfer assemblies and various fluid flow paths shown in FIGS. 4A–4F.

FIGS. 5B and 5C are more suitable as plug-in applications. The embodiment of FIG. 5D is a split system, not so adaptable for retrofit, and includes air conditioning components at a spaced location.

Similar reference characters refer to similar parts throughout the several views of the drawings.

DESCRIPTION OF THE PREFERRED EMBODIMENT

With reference now to the drawings, and in particular to FIGS. 2A through 7F thereof, a new and improved heat exchanger embodying the principles and concepts of the present invention will be described.

The present invention, the new and improved heat exchanger, is comprised of a plurality of elements. Such elements in their broadest context include spacer components, transfer sheets, and a desiccant layer on the transfer sheets for some embodiments. Such elements are individually configured and correlated with respect to each other so as to attain the desired objective.

Figure 1A:
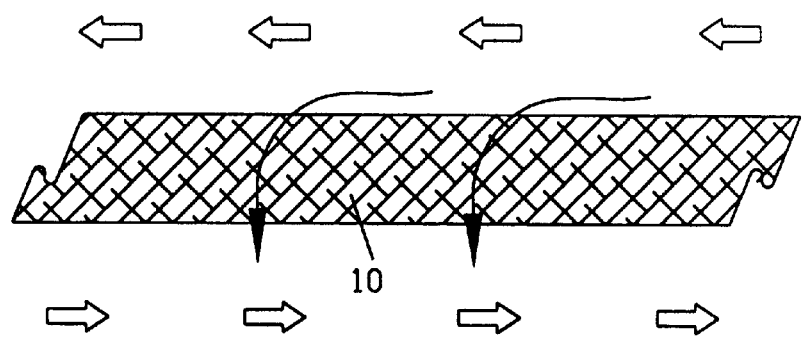
FIG. 1A (prior art) is a cross-sectional view of paper or cellulose fiber based material used as a heat and moisture transfer sheet between opposed flows of a fluid with different thermal and/or moisture properties.

More specifically, it will be noted that there is shown in FIG. 1A a prior art transfer sheet 10, shown as a piece of paper or other cellulose based material. The paper is located on opposite sides of flows of the fluid, as for example, air, gas, water or the like, in such fashion that properties of one of the fluid flows will transfer energy to the other fluid flow. The flows of fluid are designated by the arrows above and below the paper sheet. In FIG. 1A, the upper flow is a moister flow than the flow beneath the paper sheet. As a result, there will be a transfer of moisture from the upper flow to the lower flow as the moisture is transferred through the spaces between the air passageways formed between the matter which constitutes the paper. Further, the paper is a barrier through which thermal energy, heat, will transfer from the warmer flow to the cooler flow seeking equilibrium in the heat as well as equilibrium in the vapor pressure and moisture.

Figure 1B:
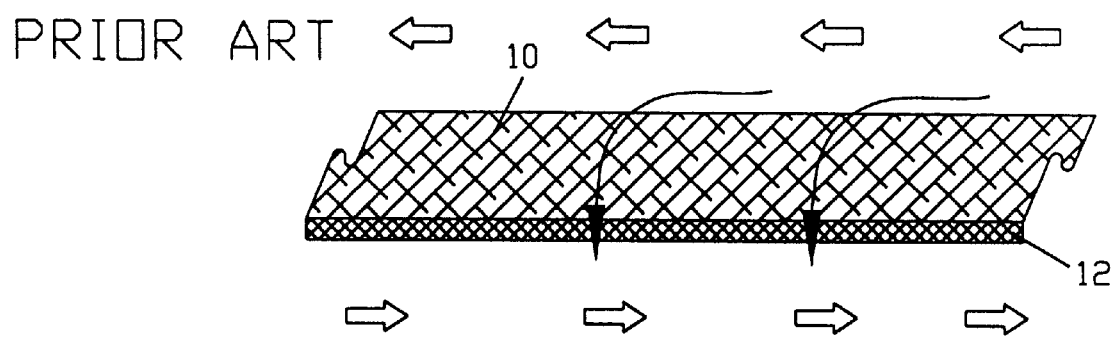
FIG. 1B (prior art) is a view similar to FIG. 1A but with a desiccant layer affixed to the output side of the paper.

FIG. 1B is a view similar to FIG. 1A except that the paper sheet is coated with a layer 12 of a desiccant material. The desiccant material is such that it will absorb moisture from the fluid flowing therethrough. Typical desiccants include silica gel, zeolites, titanium silicate, lithium chloride and similar materials along with known molecular sieves.

Figure 1C:
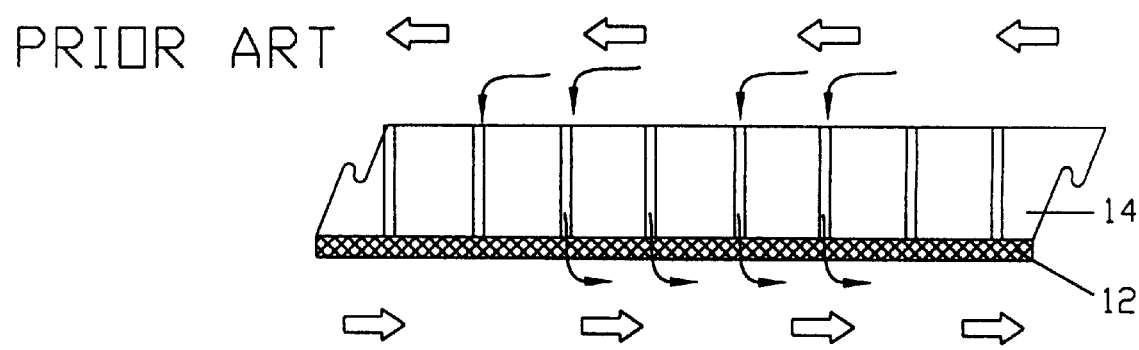

FIG. 1C is an alternate embodiment for the transfer sheet and desiccant layer 12 of FIG. 1B. The transfer sheet and desiccant layer together constitute a transfer member 14. In the embodiment of FIG. 1C, the transfer sheet is fabricated of GORE-TEX brand as with elastomer. GORE-TEX is a trademark of W. L. Gore & Associates, Inc. of Newark, Del. GORE-TEX is polytetrafluoroethylene coating on nylon fabric. It has many pores up to 9,000,000,000 per square inch. The pores form during the expanding process. The pores are about 700 times larger than a water vapor molecule but about 2,000 times smaller than a liquid water droplet. Water vapor transport through GORE-TEX is driven by a pressured gradient. The water vapor is insoluble in the polymeric material but the pores provide a path for water vapor transport. The driving force is vapor pressure on opposite sides of the GORE-TEX film. Other contaminants like CO, $CO_2$, formaldehyde, and ammonia, will pass too.

Figure 2A:
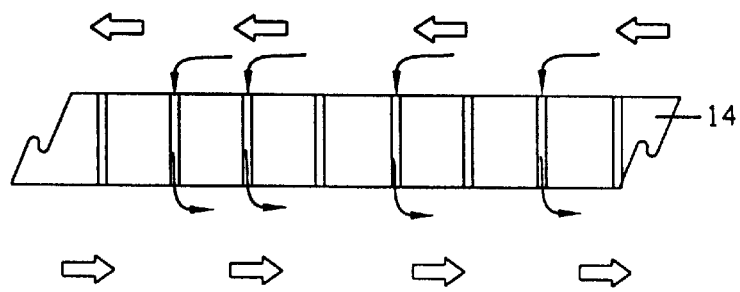
FIG. 2A is similar to FIG. 1C but excludes the desiccant layer.

The embodiment of FIG. 2A shows the transfer sheet 14 as a simple sheet of GORE-TEX as in the embodiment of FIG. 1C. In the FIG. 2A embodiment, however, the GORE-TEX transfer sheet is used without the desiccant layer 12 of FIG. 1C.

Figure 2B:
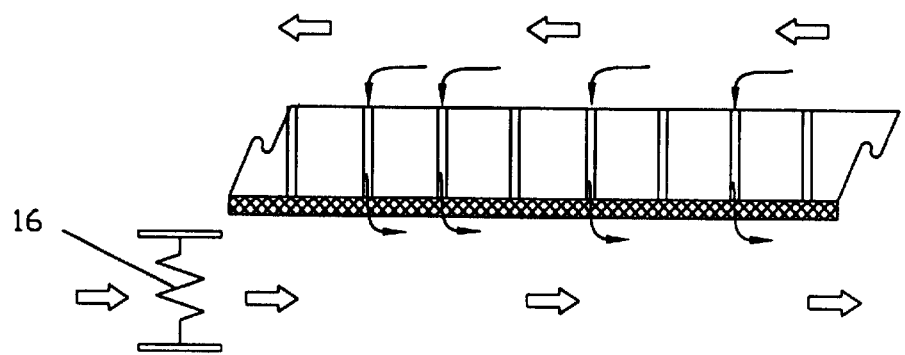
FIG. 2B is similar to FIG. 2A but includes a desiccant layer with the preheating of one of the fluid flows on the side facing the desiccant.

The FIG. 2B embodiment is similar to the embodiment of 1C except that a heating element 16 is placed in the path of flow of fluid across one side of the transfer member. The heater acts to increase the temperature of the fluid flowing across the transfer member on the side thereof containing the desiccant layer. In this manner, the additional heat provided to the flowing fluid passed over the heater will function to dry out the desiccant and remove its moisture to essentially regenerate the moisture removing capabilities of the desiccant.

Figure 2C:
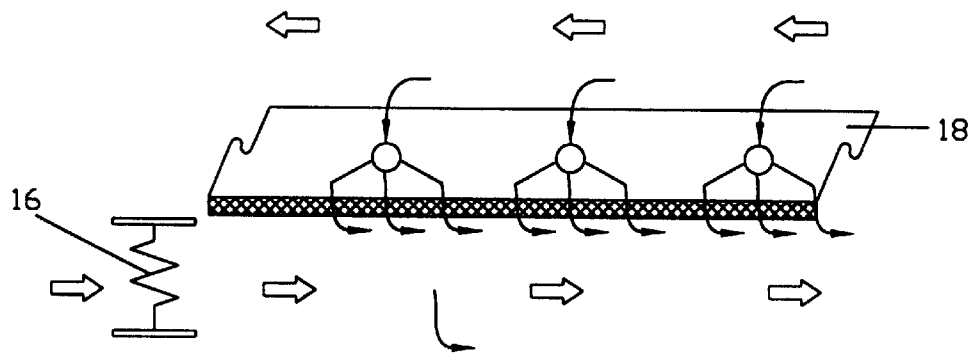
FIG. 2C is similar to FIG. 2B but utilizes an absorptive membrane, skin or film such as HYTREL as the exchanger media.

The next embodiment, that shown in FIG. 2C, is similar to that shown in FIG. 2B except that the transfer sheet 18 is fabricated of HYTREL brand engineering thermoplastic elastomer. HYTREL is a trademark of E.I. duPont De Nemours. Moisture or water vapor transport through HYTREL is by a phenomenon different from any known transfer sheet, film, or paper. The water vapor is soluble in the HYTREL. HYTREL absorbs the water vapor and the vapor moves through the HYTREL to the other side of the HYTREL sheet by diffusion followed by desorption. A concentration difference drives the diffusion across the HYTREL.

The major difference in the two modes of water vapor transport is that GORE-TEX consists of a material that is insoluble to water vapor with pores in it that provide for water vapor transport through the material. Water vapor is absorbed in the HYTREL and the water vapor moves through the HYTREL by a diffusion process which is driven by the vapor pressure and/or concentration difference between each side of the HYTREL.

Figure 2D:
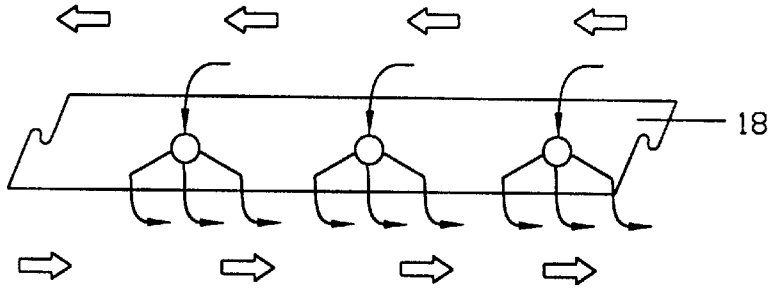
FIG. 2D is a view similar to FIG. 2C but excludes the desiccant layer on the heating element or preheating section.

The embodiment shown in FIG. 2D is similar to that shown in FIG. 2C. The transfer sheet is simply a sheet 18 of GORETEX. The desiccant layer has been removed and, in association therewith, the heating element is also removed since there is no need to regenerate a desiccant.

Figure 3A:
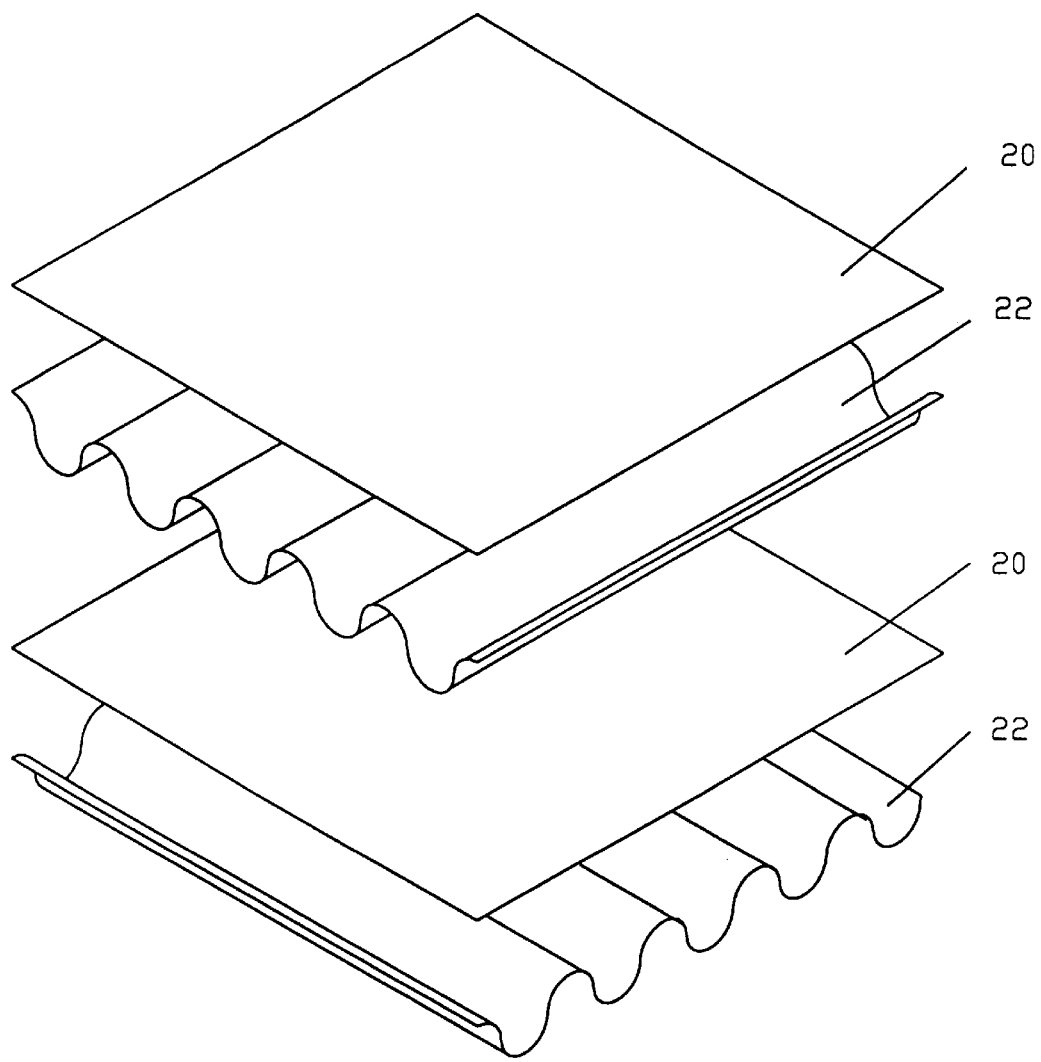
FIG. 3A is an exploded perspective illustration of a typical apparatus employing plural layers of membranes as the transfer sheets of FIG. 2D and includes spacer components between the transfer sheets to guide the flows of fluid with respect to the sheets.

FIG. 3A is a perspective illustration of plurality of transfer sheets in a superimposed relationship, preferably parallel with respect to each other for the flow of properties there through. The sheets 20 of the FIG. 3A embodiment may be any of the transfer sheets of the prior embodiments. In addition, to allow the flow of fluid in contact with and between the various sheets, spacer components 22 are utilized. The spacer components not only hold the transfer sheets in proper spaced relationship for the flow of fluid there between and there against, the spacer components 22 also provide proper directional flow for the fluid for maximum efficiency for the particular application.

FIG. 3B is a perspective illustration of an alternate embodiment similar to FIG. 3A, but adds a desiccant layer 12 to each of the transfer sheets. In this manner, a transfer member of a transfer sheet and desiccant layer is located in spaced planes with spacer components therebetween.

FIGS. 3C through 3H illustrate alternate embodiments for the common cross-sectional configuration of various types of spacer components. These spacer geometry configurations include the sinusoidal cross-sectional configuration 22 as shown in FIGS. 3A, 3B and 3C. A triangular cross-sectional configuration 24 for the spacers is shown in FIG. 3D. FIG. 3E shows a spacer component 26 with a rhomboidal configuration. A sawtooth configuration 28 for the spacer components is shown in FIG. 3F. Finger-shaped spacer components 30 are shown in FIG. 3G. In addition, spacer components shown as contiguous tubes 32 are shown in FIG. 3H. A final cross-sectional configuration for a spacer component is shown in FIGS. 3J through 3M. These spacer components are shown as sheets 34. Such sheets have hemispherical projections 36 alternately projecting at spaced locations upwardly and downwardly from a planar central base layer 38. In this embodiment, a cross-sectional configuration is not common along the length. It should be appreciated, however, that any type of spacer configuration could be utilized for its intended purpose of holding apart the transfer sheets and for allowing the flow of fluid in a path of travel in contact with adjacent sheets. FIG. 3J is a cross-sectional view while FIG. 3K is a top plan view of the hemispherical spacer components embodied. FIG. 3L is a cross-sectional view of a transfer assembly 40 fabricated with the spacer components of FIGS. 3J and 3K in stacked relationship with transfer sheets 20 between adjacent spacer components. FIG. 3F is an exploded perspective view of a portion of the transfer assembly shown in FIG. 3F.

FIGS. 4A through 4F illustrate various flow configurations through a transfer assembly of the type previously described. In each embodiment, a transfer assembly 40 is used for the transfer of thermal and/or moisture properties between a first fluid A and second fluid B flowing with respect to the transfer assembly.

Figure 4A:
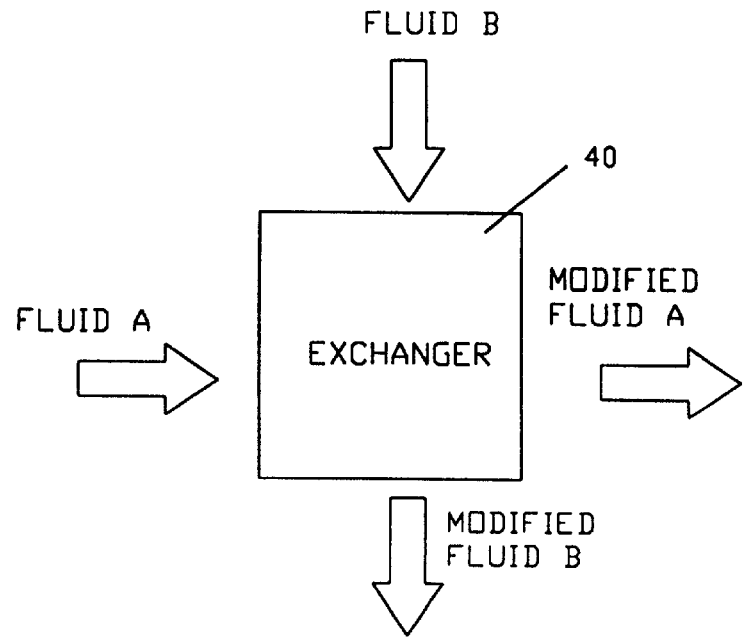
FIGS. 4A–4F are schematic illustrations of transfer assemblies of the type shown in FIGS. 3A, 3B and 3M illustrating alternate flow paths for the fluids.

FIG. 4A shows the broad concept of fluid A having modified properties after passage through the transfer assembly in one direction while a second fluid, fluid B, with properties different than the first fluid A moving in a direction different from that of fluid A, but through the transfer assembly with the properties of fluid B, also being modified.

Figure 4B:
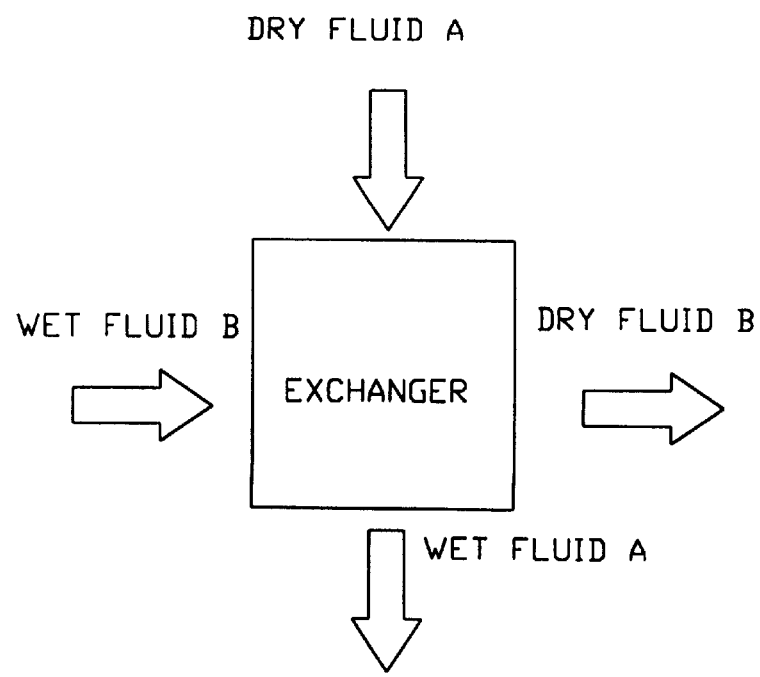

FIG. 4B is similar to the FIG. 4A embodiment except that fluid A begins as a dry fluid and, after passage through the transfer assembly, becomes wet or moist. The second fluid B moving in a second path begins as a more wet fluid and becomes dryer through the transfer option in the transfer assembly.

Figure 4C:
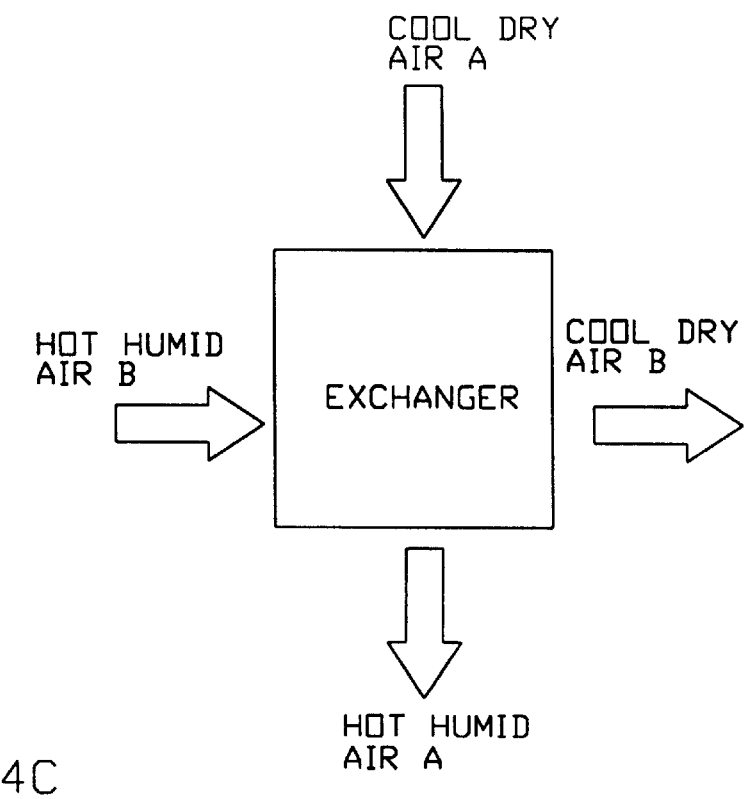

FIG. 4C is similar to FIG. 4A except that the airflow in the first path begins as cool, dry air and terminates as hot, humid air beyond the transfer assembly while the second flow of fluid B changes from hot, humid fluid to cool, dry fluid following the transfer option within the transfer assembly.

Figure 4D:
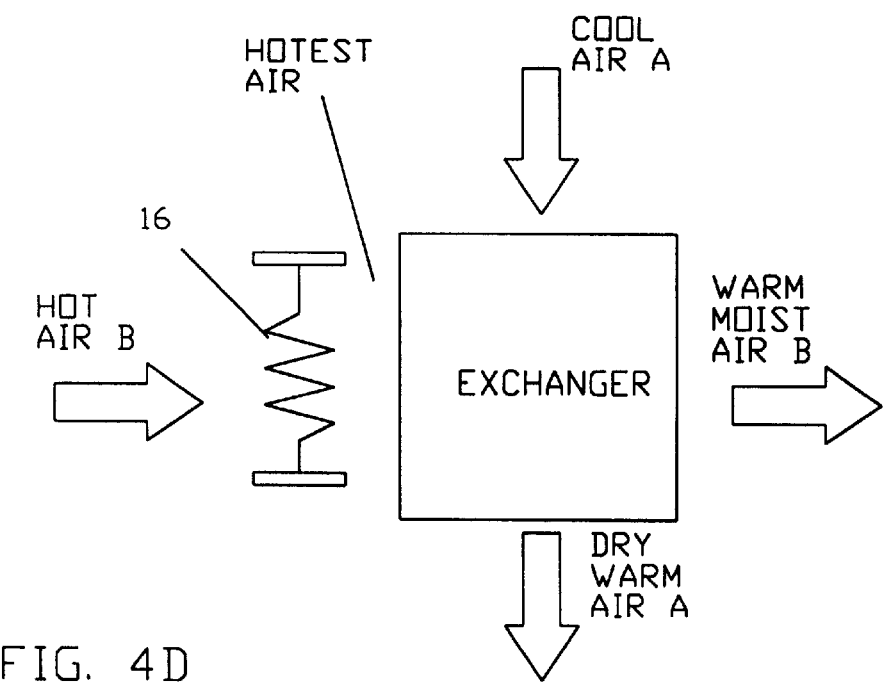

The heat exchanger of the FIG. 4D embodiment further utilizes a heater 16 in the path of flow of the second fluid, hot air, before leaving the transfer assembly as warm, moist air. In this embodiment, a desiccant layer is utilized on the transfer sheets for the path of flow of fluid B initially passed over the heater for desiccant regeneration. In this embodiment, the first flow of fluid, cool air, becomes dry, warm air after the transfer option within the transfer assembly, all with no moving parts in the transfer assembly.

Figure 4E:
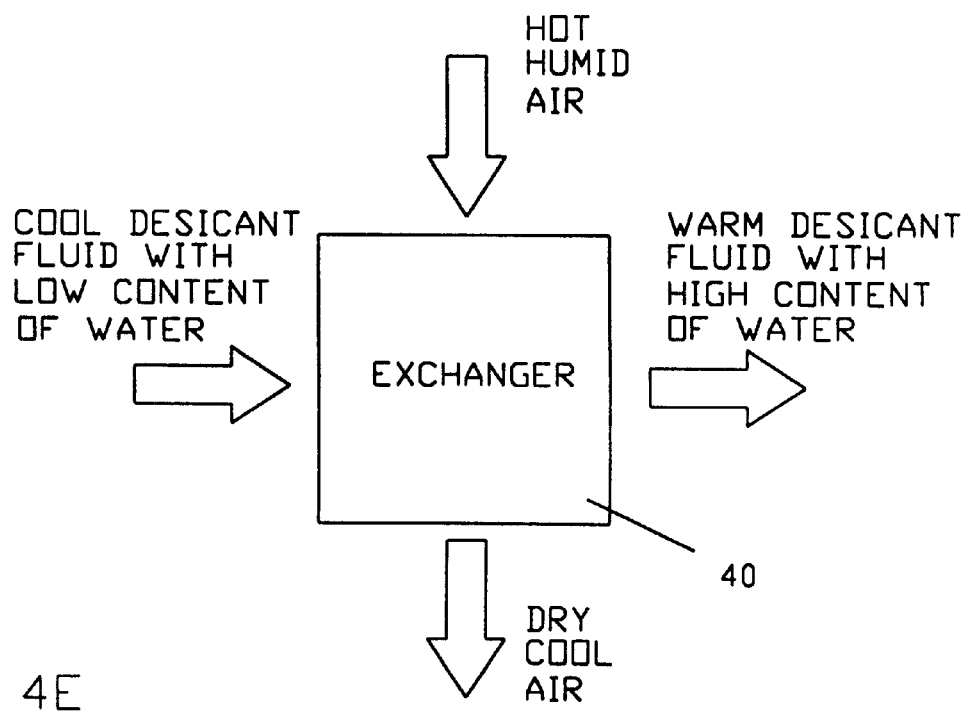

FIG. 4E is similar to FIGS. 4A, 4B and 4C with the first flow of air being hot, humid air entering the transfer assembly and leaving as dry, cool air. The second flow of air is cool, desiccant fluid with a low content of water which becomes warm, desiccant fluid with a high content of water after the transfer option within the transfer assembly.

Figure 4F:
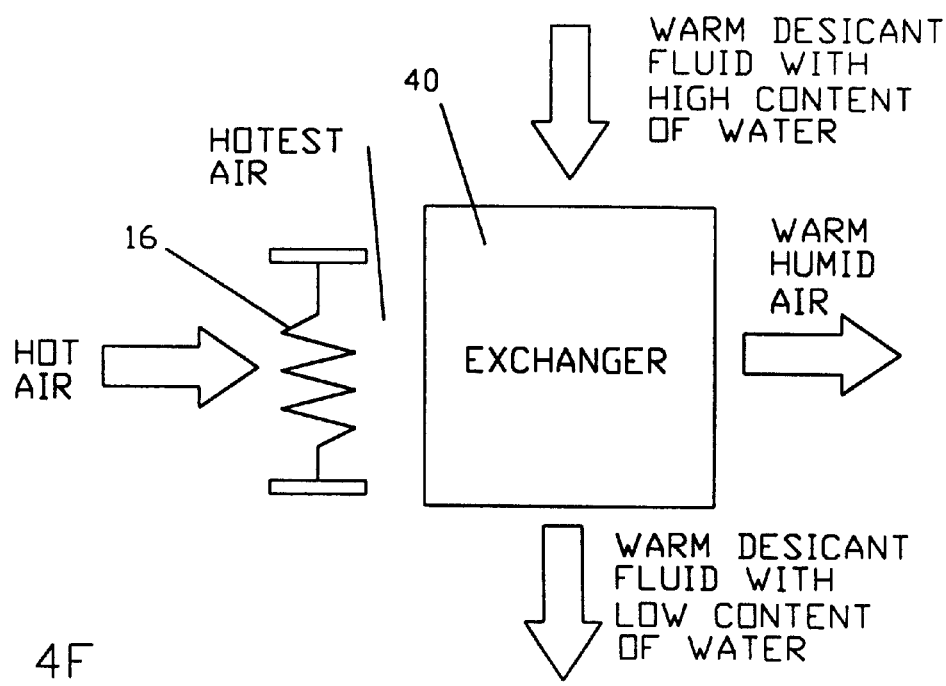

The last embodiment, that of FIG. 4F, employs a transfer assembly 40 with a heater 16 similar to that shown in FIG. 4D. In such embodiment, the first flow of fluid is a warm desiccant fluid with a high content of water as it enters the transfer assembly and becomes a warm desiccant fluid with a low content of water leaving the transfer assembly. The second flow of air is hot air further heated through the heater 16 which passes through the transfer assembly and leaves as warm, humid air after the transfer of properties. In this manner, the properties of both flows try to be in equilibrium of physical conditions.

Figure 4G:
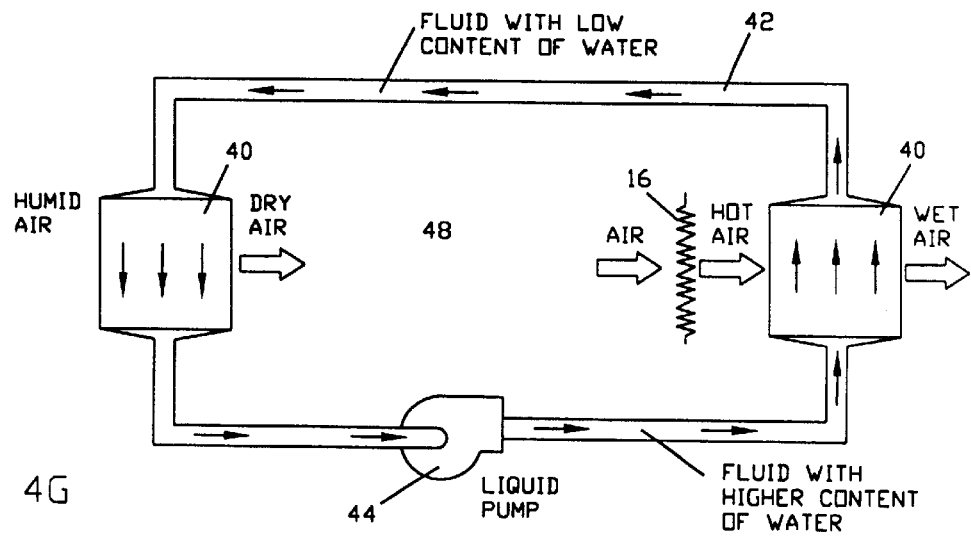
Figure 4H:
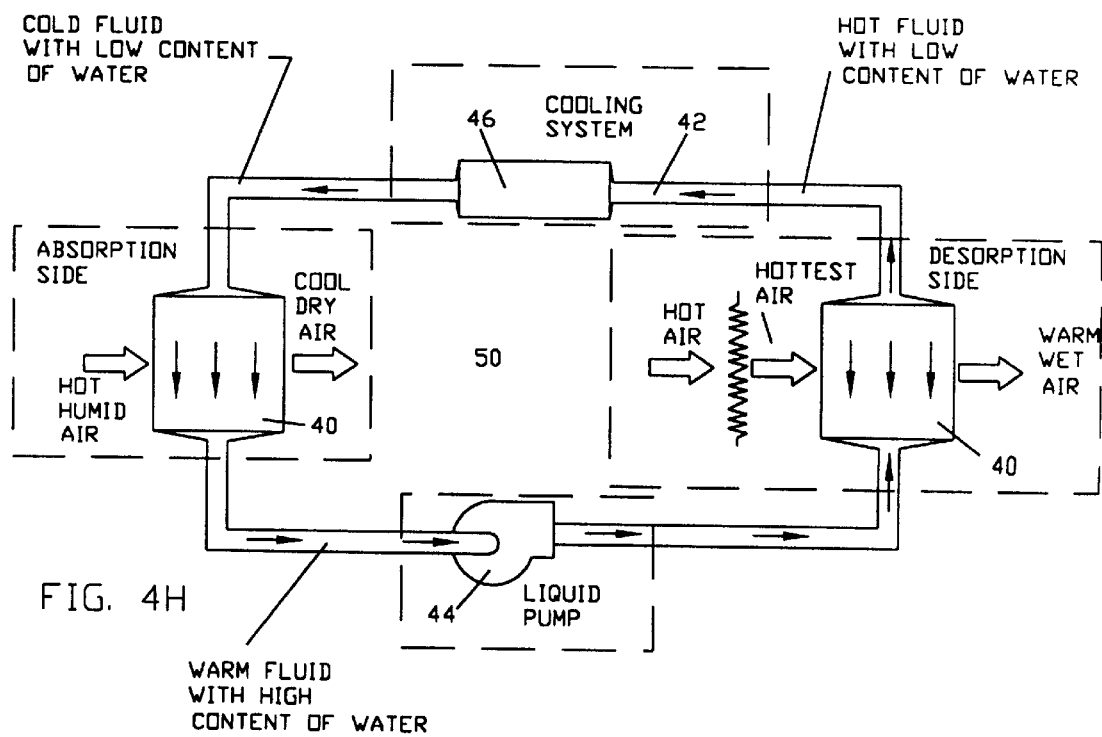
Figure 41:
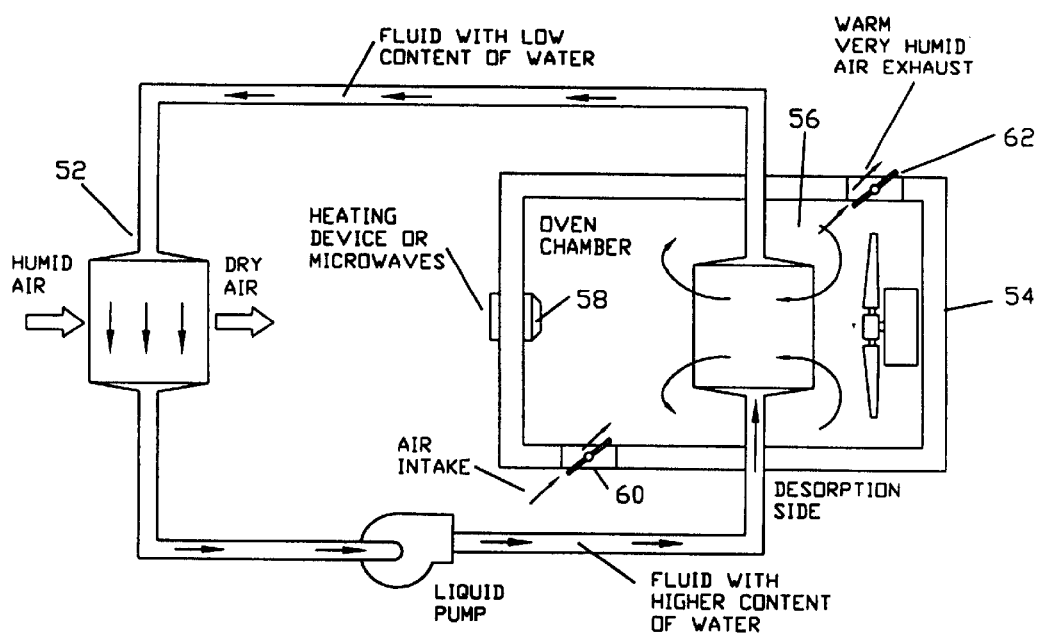

FIGS. 4G, 4H and 4I show applications for the transfer assemblies of FIGS. 4A through 4F but utilize two transfer assemblies 40 arranged as property transfer systems. In this FIG. 4G embodiment, a common conduit or pipe 42 functions to effect the flow of the working fluid with a low content of water which passes through the various transfer assemblies. A pump 44 effects such flow of the absorbent fluid. In association therewith, flows of air are passed through the transfer assemblies to effect the appropriate transfer of properties. One flow of air transfers input humid air resulting in dry air while the other transfer assembly receives air, heated through a heater 16, entering the transfer assembly which leaves the transfer assembly as wet air. Together the heater, conduit and pump constitute a property transfer system 48.

The system embodiment of FIG. 4H also uses a pair of transfer assemblies 40 with a conduit 42 and pump 44 as in the embodiment of FIG. 4G. In the FIG. 4H embodiment, however, a cooling system 46 is utilized in the conduit 42 at a location between the two transfer assemblies remote from the pump 44. In this embodiment, there is an absorption side with an absorption transfer assembly wherein hot, humid air is converted to cool, dry air while the other transfer assembly is a desorption side wherein hot air is heated through a heater element 16 and results in warm, wet air following passage through the transfer assembly. This system 50 is similar to the system 48 of FIG. 4G but is adapted for its particular function adding the cooling system.

A third property transfer system 52 is shown in FIG. 4I. Such system is similar to the embodiment of FIG. 4G except at the second transfer assembly which is contained within an oven and/or chamber 54, whether convection, radio frequency, ultrasound, microwave, or the like. Such oven has an interior 56 as well as a heating device such as a microwave generator 58. An air intake valve 60 accepts air which is heated. The oven also has an exhaust port 62, adjustable as the intake port, for exhausting warm, very humid air from the oven 54.

Figure 5A:
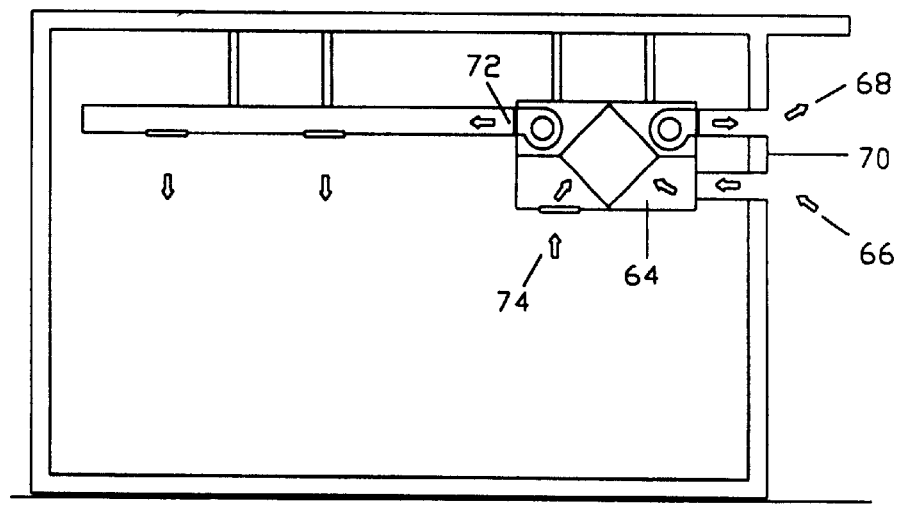
FIGS. 5A–5E are schematic illustrations of a room, building, or like enclosed space having its interior space provided with air being treated by a transfer system of the type shown in FIGS. 4G–4I with associated HVAC components for heating and cooling.
Figure 5B:
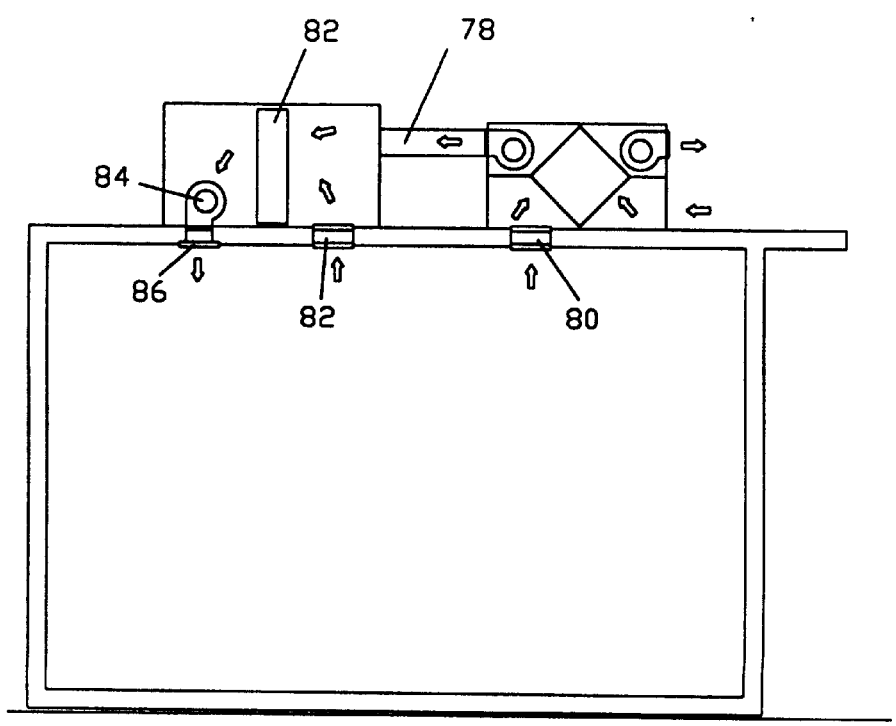

FIGS. 5A through 5E show alternate embodiments of applications for the transfer assembly and transfer systems of the prior Figures. The application of FIG. 5A shows a system 64 with an enclosed space having an input duct 66 and an output duct 68. In such embodiment, ambient air enters the enclosed space and is passed through one side of a transfer assembly at 70 and exhausts at 72 into the room or other enclosed space. Air is exhausted from the room through a duct 74 and passes through the transfer assembly as a second flow to exhaust from the enclosed space to the atmosphere at the output duct 68. The property transfer system of FIG. 5B is similar to that shown in FIG. 5A in that it has an input duct 78 and an output duct 80. Passage of ambient air into the system constitutes a flow of fluid in one direction through the transfer assembly while the exhausting air moves through the transfer assembly in a different direction to exterior of the device. In the FIG. 5B embodiment, a supplemental cooling component 82 receives the ambient air passed through the transfer assembly prior to entering the enclosed space. A fan 84 effects the proper flow of air. A supplemental duct 86 allows partial re-circulation of the air in the room back to the cooling unit 82.

Figure 5C:
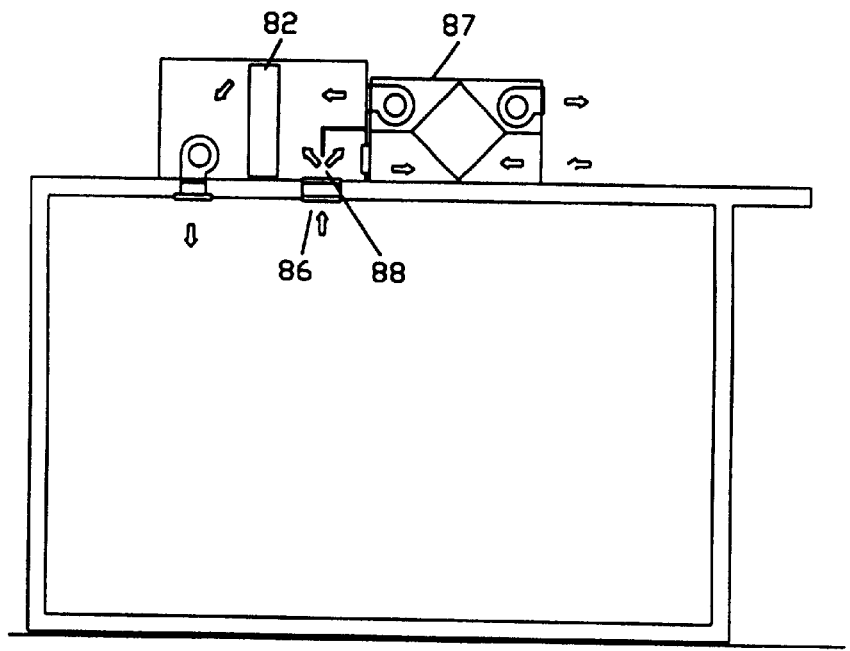

The FIG. 5C deploys a property transfer system 87 in a configuration similar to that shown in FIG. 5B. In the FIG. 5C embodiment, the recirculating air through duct 86 passes to a splitter 88 for directing some of the recirculating air back through the cooling component 82 with the rest of the exhausting air from duct 86 constituting the second flow of air through the transfer assembly. This arrangement is for plug-in applications, normally retrofits for existing air conditioners.

Figure 5D:
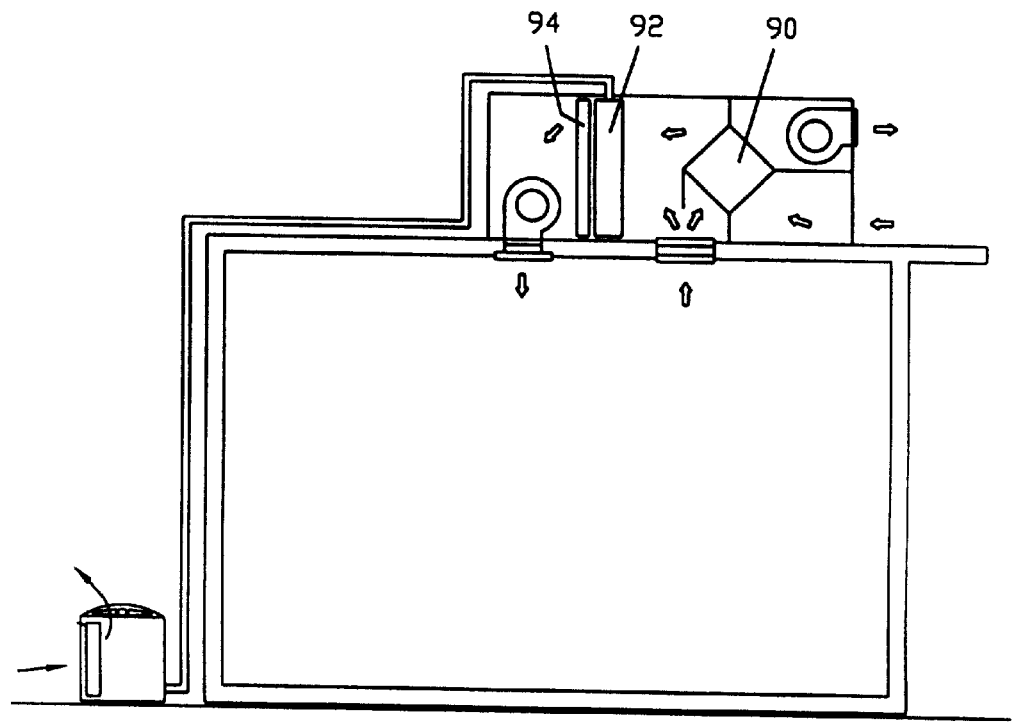

The FIG. 5D embodiment is yet another application for the present invention. In the FIG. 5D embodiment, the transfer system 90 is in systems configuration with an air conditioning unit as a package allowing for the pretreatment of air passed into the room through a preheater 92 followed by a cooling component 94 in systems configuration with an air conditioner having a remote condenser unit remote from the other components of the system.

Figure 5E:
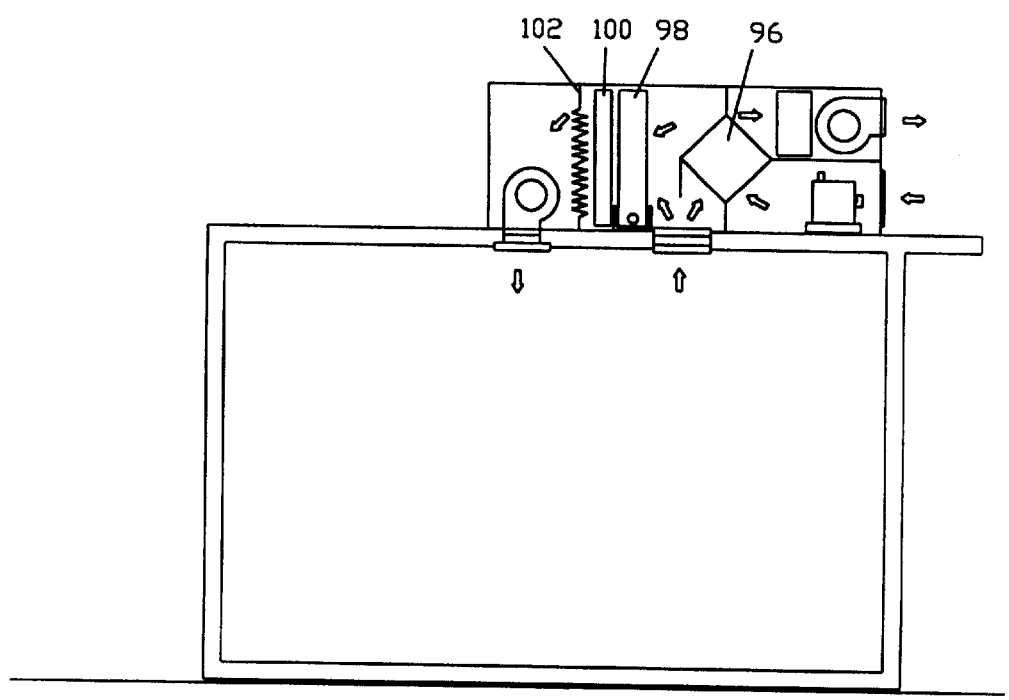

The final application is shown in FIG. 5E and is constituted as a property transfer system 96. Such embodiment is similar to that shown in FIGS. 5C and 5D and has a heating element 98, a supplemental cooling element 100 and a further heating element 102 for treating the air prior to passage to the room.

FIGS. 5F through 5Q illustrate further embodiments of a property transfer system similar to those of the prior Figures. In the FIG. 5F embodiment, system 104 includes an elongated property transfer assembly 106. In such embodiment, fresh air intake moves through the entire length of the transfer assembly and passes through a cooling component 108 before it is moved by a fan 110 to supply air to the room. Room return air is passed through the upper portion of the transfer assembly 106 and constitutes an enthalpy change. The output is then exhausted to atmosphere. A second flow of outside air passes over a heating element 16 through the lower portion of the transfer assembly to exhaust to atmosphere with a change at the lower portion of the transfer assembly being for a change of latent properties.

Figure 5F:
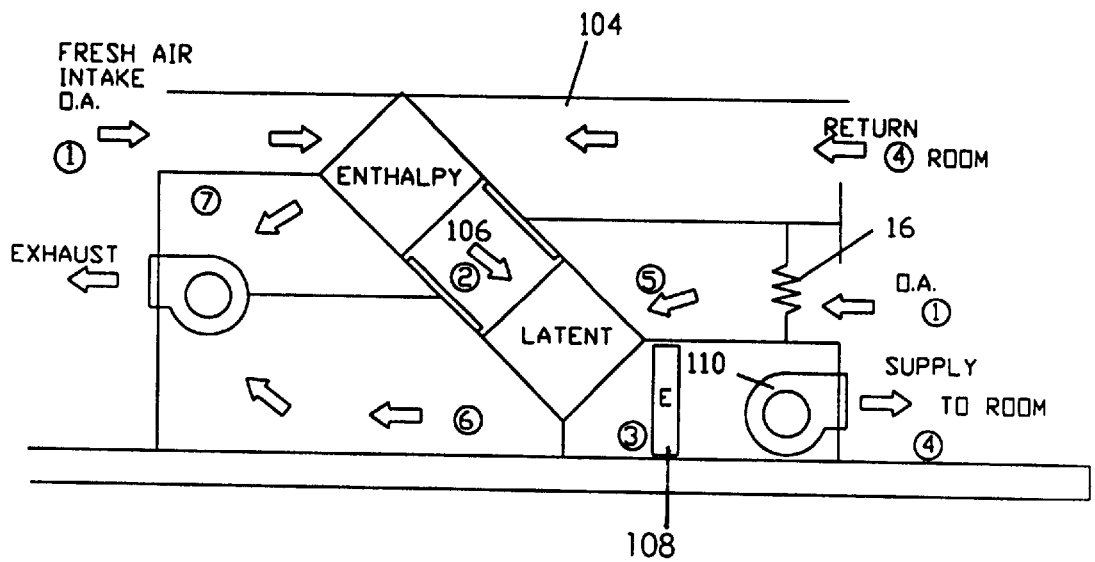
FIG. 5F is a schematic illustration of a transfer system for a room, building, or like enclosed space of the type shown in FIGS. 5A–5E and showing separate enthalpy and latent flow paths.
Figure 5G:
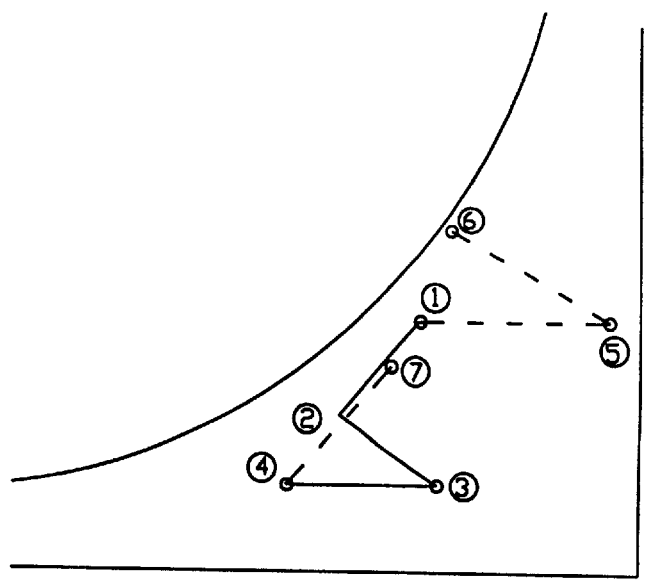
FIG. 5G is a psychometric chart illustrating the state of the fluid in the system shown in FIG. 5F.

FIG. 5G is a psychometric chart illustrating the change of properties of the flow of air at various locations within the system of FIG. 5F.

Figure 5H:
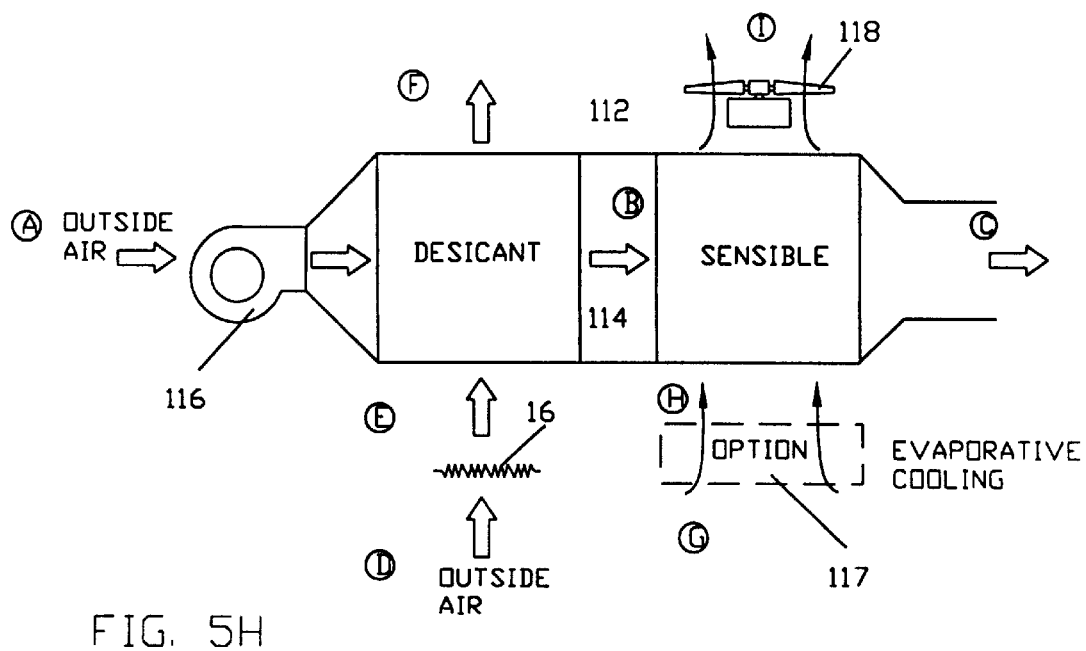
FIG. 5H is a schematic illustration of a transfer system for a room or like enclosed space similar to the type shown in FIG. 5F showing separate desiccant and sensible flow paths.

FIG. 5H shows a further system 112 wherein outside air enters an elongated transfer assembly 114 being moved by a fan 116 prior to exhaust at the opposite end of the transfer assembly. At the first side of the transfer assembly, outside air is moved through heater 116 through the first side of the transfer assembly for varying the moisture properties at the desiccant side of the transfer assembly. At the second side of the elongated transfer assembly, there is an optional evaporated cooling assembly 117 for air passing through the transfer assembly wherein a supplemental fan 118 draws the air there through for changing the sensible characteristics of the treated air.

Figure 5I:
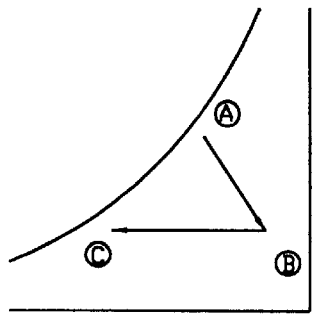
FIGS. 5I–5K are psychometric charts illustrating the change of conditions of different air streams or air paths of the fluid employed in the system of FIG. 5H.
Figure 5J:
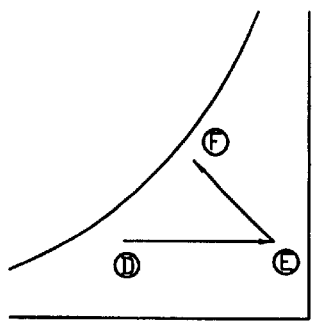
Figure 5K:
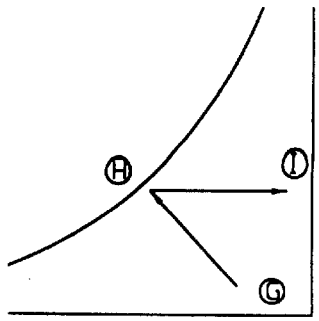

FIGS. 5I, 5J and 5K illustrate psychometric charts illustrating the change of properties of the flow of air at various locations within the system of FIG. 5H.

Figure 5L:
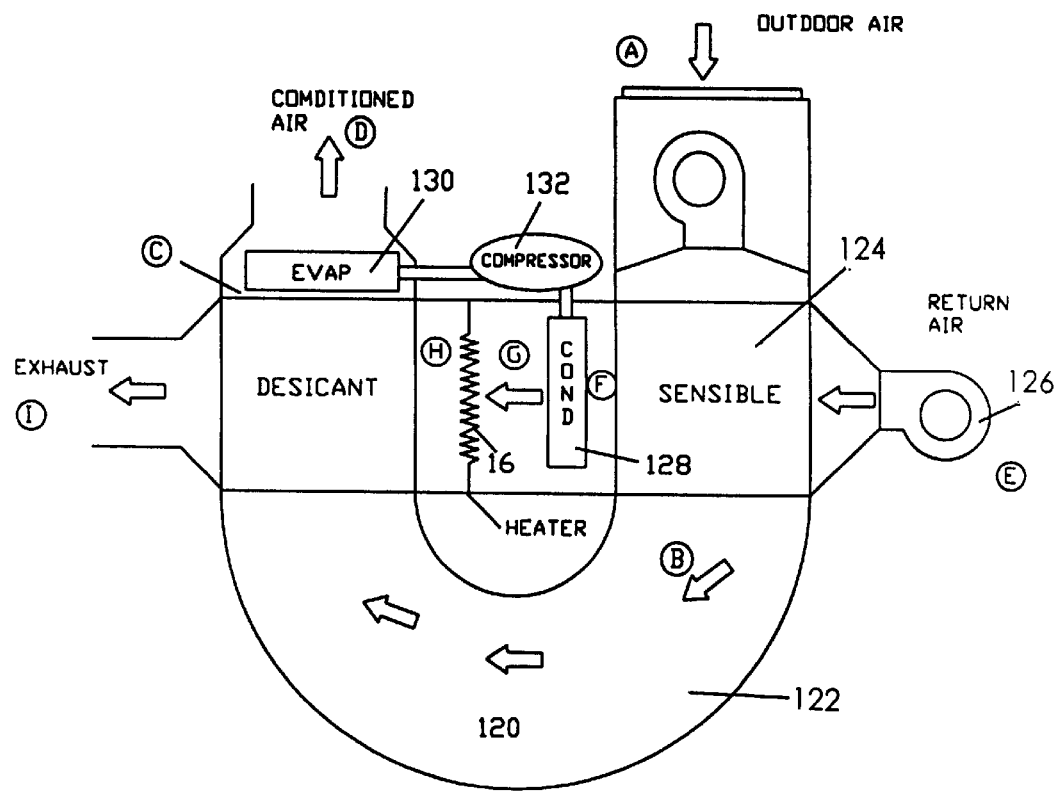
FIG. 5L is a cross-sectional view of another fluid treatment system similar to the type shown in FIG. 5H but utilizing alternate flow paths.
Figure 5M:
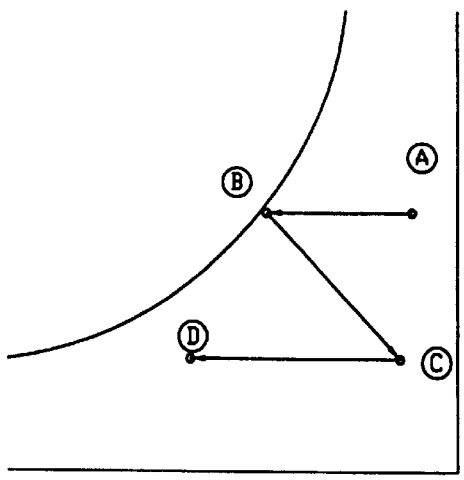
FIGS. 5M and 5N are psychometric charts illustrating the conditions of the fluid employed in the system of FIG. 5L.
Figure 5N:
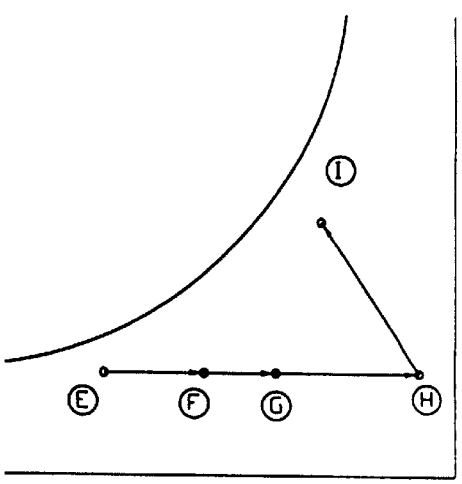

FIG. 5L illustrates a system 120 similar to that shown in FIG. 5H, except that the linear path of fluid is converted to a U-shaped curved path 122 through appropriate conduits having open upper ends for the input and output of the fluid. In the FIG. 5L embodiment, the direction of flow is opposite from that shown in FIG. 5A with the outdoor air passing first through the sensible side of the transfer assembly 124, reversing direction and passing through the desiccant side of the transfer assembly. In addition, the air flow in the opposite direction from the primary air flow moves return air through a fan 126 through the sensible side of the transfer assembly to the desiccant side prior to exhaust. Between the sensible and desiccant sides of the transfer assembly is a condenser 128 of an air conditioning system with an evaporator 130 of such air conditioning system at the output side of the desiccant portion of the transfer assembly. A compressor 132 is in systems configuration with the condenser and evaporator. In addition, a heater 16 is provided in advance of the desiccant portion of the transfer assembly. FIGS. 5M and 5N are psychometric charts illustrating the change of properties of the fluid through the system of FIG. 5L.

Figure 5O:
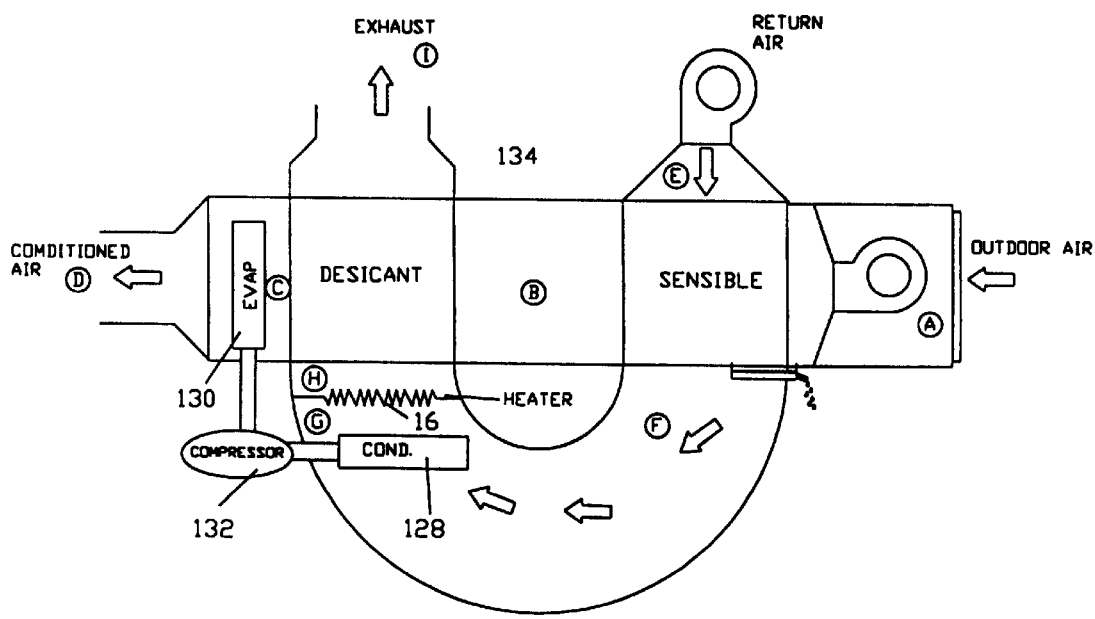
FIG. 5O is a cross-sectional view of yet another fluid treatment system constituting an alternate embodiment to the type shown in FIG. 5L but utilizing further modified flow paths.
Figure 5P:
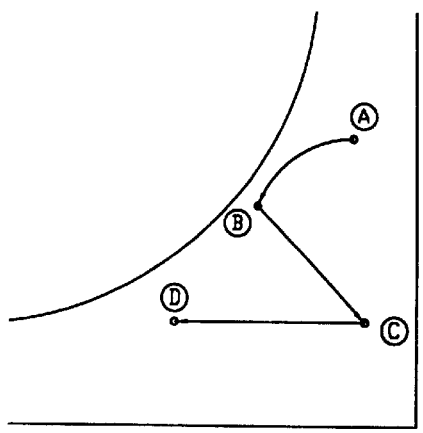
FIGS. 5P and 5Q are psychometric charts illustrating the conditions of the fluid employed in the system of FIG. 5O.
Figure 5Q:
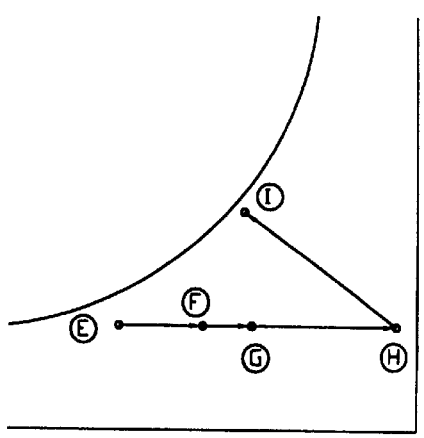

The last embodiment is shown in FIG. 5O. Such system is similar to that shown in FIG. 5L except that the air conditioning system has its condenser 128 in the first path of flow prior to the desiccant side of the transfer assembly followed by a heater 16. The evaporator 130 is located in the second path of flow following the desiccant portion of the transfer assembly. A compressor 132 once again couples the conditioner and the evaporator. In addition, psychometric charts 5P and 5Q show the state of the fluid at various locations through the system 134 of FIG. 5O.

Figure 6A:
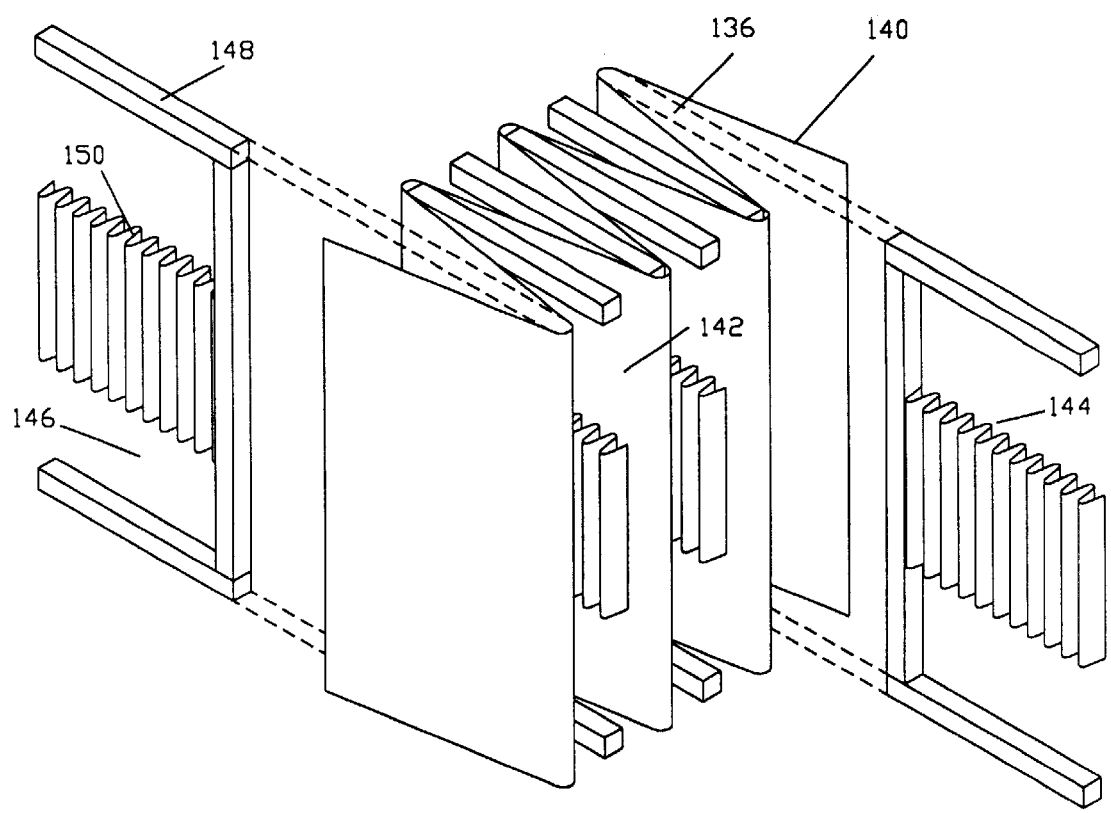
FIGS. 6A–6B illustrate alternate embodiments of a fabrication method for a transfer sheet similar to those in FIGS. 3A, 3B and 3M but allowing for alternate flow paths.
Figure 6B:
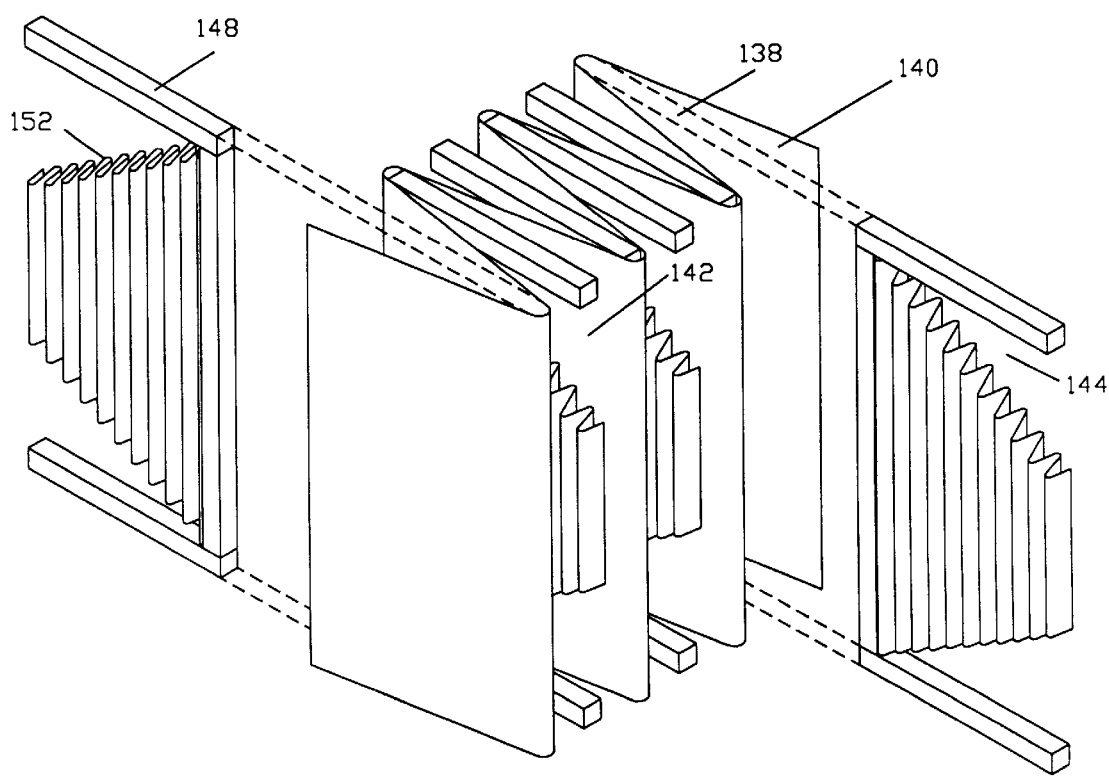

FIGS. 6A and 6B illustrate alternate configurations for the transfer assembly. In the embodiment of FIG. 6A, whether the transfer assembly 136 of 6A or the transfer assembly 138 of FIG. 6B, the transfer sheet 140 is folded back and forth upon itself in a generally Z-shaped configuration but with long parallel walls forming interior enclosed spaces 142 between the transfer sheets. The enclosed spaces thus form openings 144 and 146 on opposite sides. Oppositely facing C-shaped frame members 148 maintain the sheets in their proper orientation. Located within the enclosed spaces are sinusoidal-shaped spacer components 150 in the FIG. 6A embodiment and 152 in the FIG. 6B embodiment. The spacer components function to channel the fluid flow from the upper region of each enclosed space to a lower region of each enclosed space. In the FIG. 6A embodiment, the spacer components are sinusoidal but in a rectangular configuration when viewed from the front. In the FIG. 6B embodiment, the spacer components are once again sinusoidal in cross-sectional view but are generally triangular when viewed from the front.

Figure 6C:
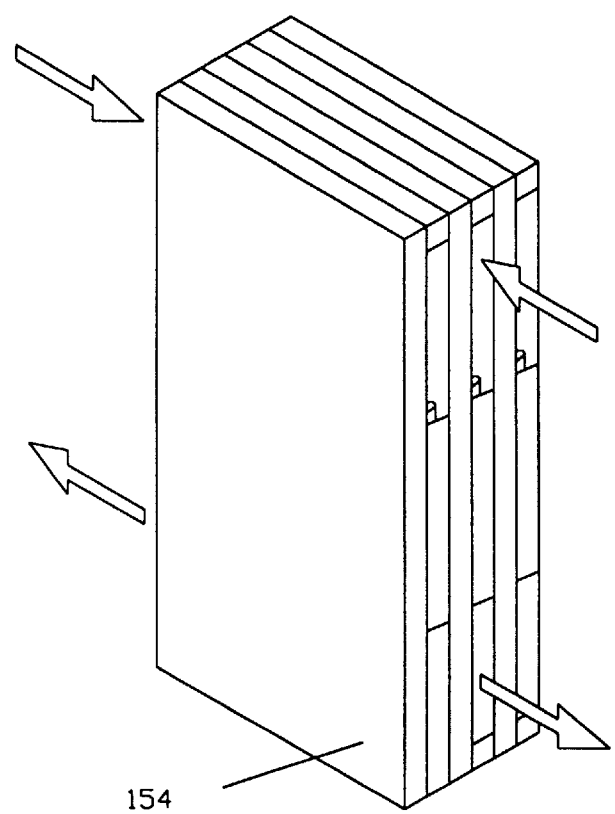
FIGS. 6C–6E illustrate alternate constructions and usages of transfer sheets for exchanger systems of the type shown in FIGS. 6A and 6B with FIG. 6D illustrating parallel flow and FIG. 6E illustrating counter flow.
Figure 6D:
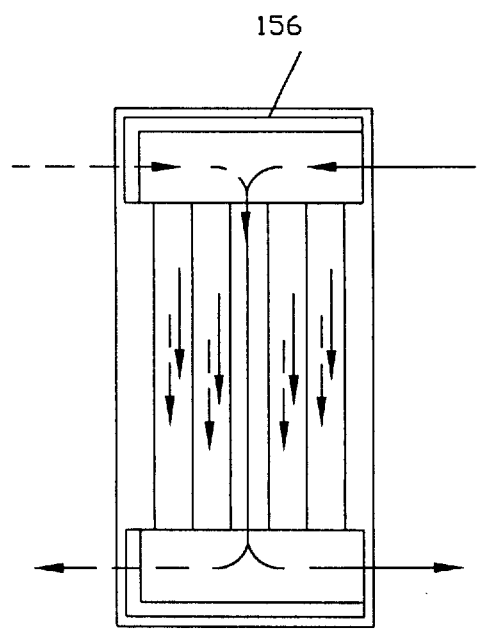
Figure 6E:
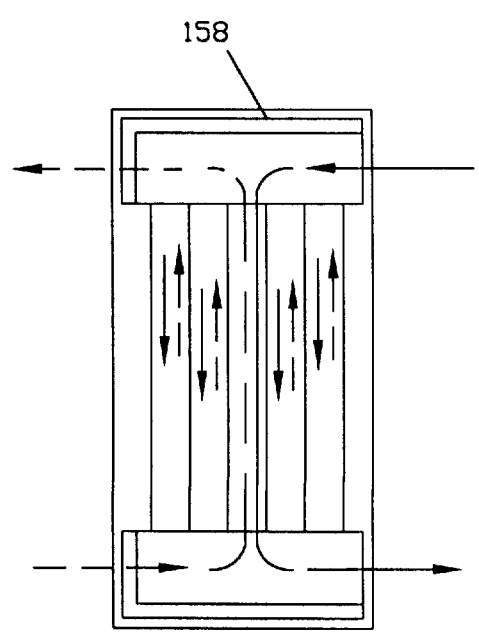

FIGS. 6C, 6D and 6E illustrate the transfer assemblies of FIGS. 6A and 6B illustrating different flow patterns for air or other fluids entering and leaving the embodiments of 6A and 6B. Note transfer assemblies 154, 156 and 158. The FIG. 6C embodiment allows the input flows at the top of the unit. Note the perspective of FIG. 6C and its cross-sectional view of FIG. 6D wherein the flows are parallel. The FIG. 6E embodiment shows the transfer assembly 158 where one input side is at the top along with an output side with one input and output side at the bottom for counter flow.

Figure 6F:
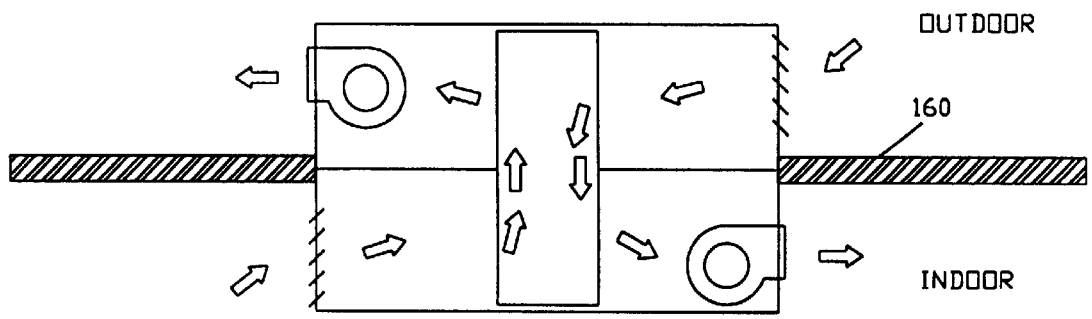
FIGS. 6F and 6G illustrate the transfer sheets of FIGS. 6C–6E in a systems configuration.
Figure 6G:
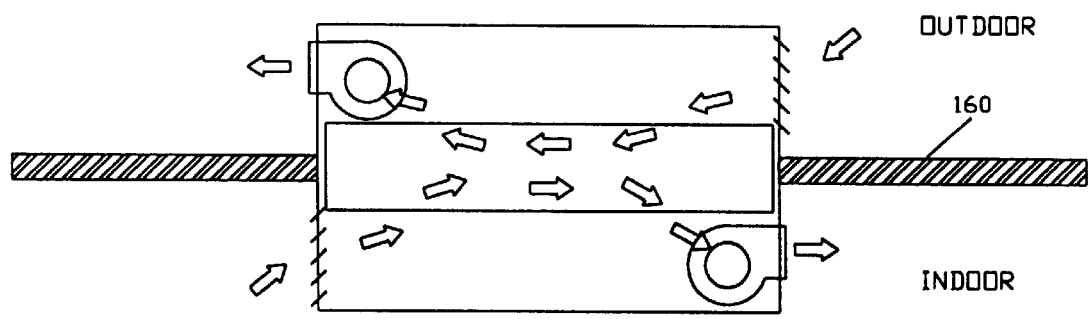

FIGS. 6F and 6G illustrate the transfer assembly embodiments of FIGS. 6D and 6E in association with a wall, preferably a roof 160 of an enclosed space to be thermally treated to illustrate the flows of air with respect thereto.

Figures 7A, 7B, 7C, 7D:
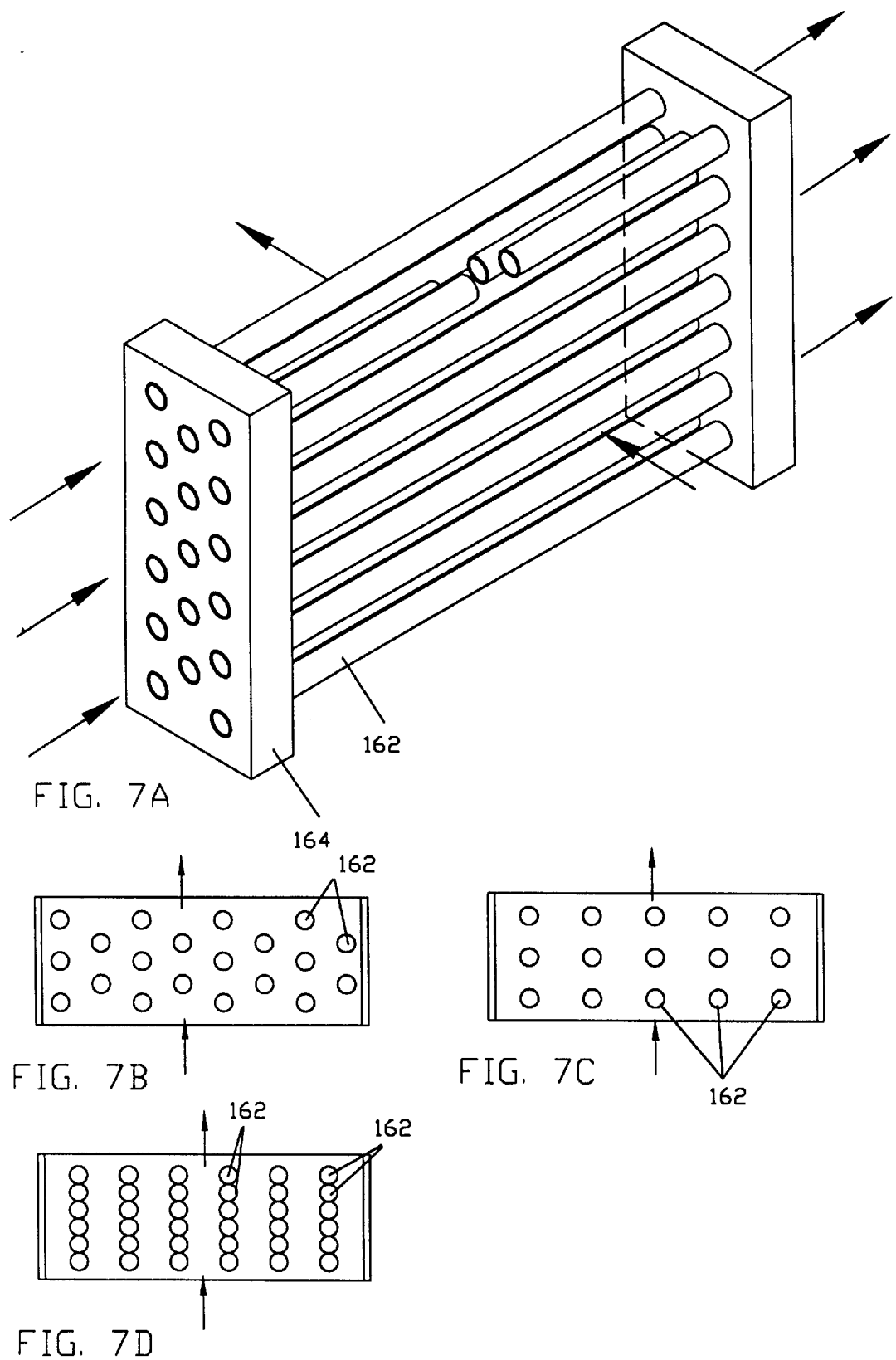
FIGS. 7A–7D illustrate alternate embodiments for the construction of transfer sheets formed as tubes and functioning with cross flows through various tube arrangements.
Figure 7E:
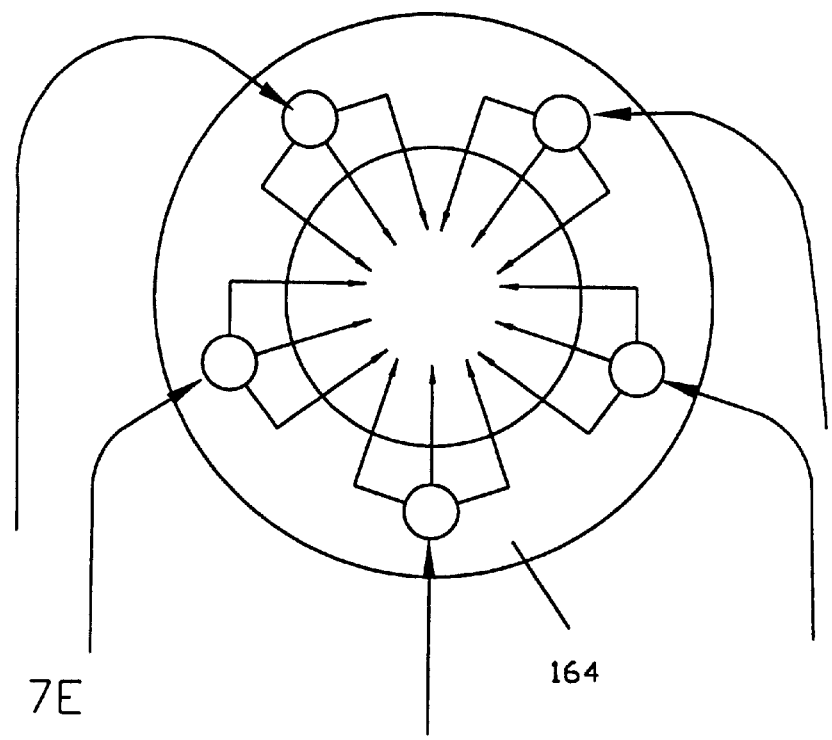
FIGS. 7E and 7F are cross-sectional views of tubes as shown in FIGS. 7A through 7D, 7E including a transfer sheet and FIG. 7F including a transfer sheet as well as a desiccant layer.
Figure 7F:
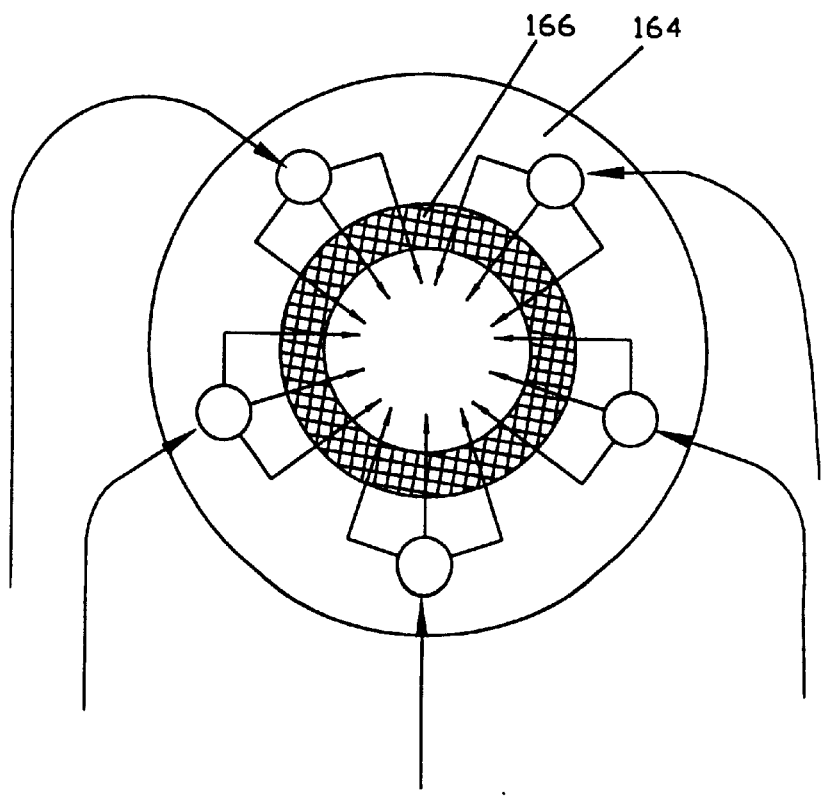

FIGS. 7A through 7F show a plurality of transfer sheets formed as tubes 162. Such tubes 162 are fabricated of a heat and humidity transfer material as described in the prior embodiments, preferably HYTREL. In such embodiment, one flow of fluid passes in a common direction in the tubes. A second flow of fluid passes across the tubes. The transfer of properties is essentially the same as that in the prior embodiments. Support members 164 are located on opposite sides of the tubes for proper positioning. FIG. 7B shows the tubes in a staggered relationship. FIG. 7C shows the tubes in aligned rows and columns. FIG. 7D shows the tubes in contiguous rows.

The last embodiment of the system shows the tubes formed with a transfer sheet 164, preferably HYTREL or similarly functioning material, illustrating the flow of fluid from exterior of the tubes to interior. The FIG. 7F embodiment is similar to that of FIG. 7E but has, in addition to the HYTREL transfer sheet 164, a supplemental desiccant layer 166 on the interior surface of the HYTREL transfer sheet. In these embodiments, fluid of a higher humidity passes through the HYTREL layer formed as a pipe where it is absorbed and passes radially inwardly. The fluid is diffused in the HYTREL layer and desorbed interiorly of the pipe where it intermixes with the fluid of lower humidity or a liquid desiccant originally passing through the pipe. Equilibrium is thus approached between the fluid exterior of the pipe and the fluid interior of the pipe.

The present invention is through a device that transfers total energy between two fluid streams. The total energy has two components. The first component is sensible, or temperature. The second component is latent, or moisture. The device is built with various layers of total energy transfer media or thermal plastic or similar material, preferably HYTREL, with a property of absorb, diffuse and desorb water vapor from one fluid stream to another. This means temperature and moisture will try to be in equilibrium between the two fluid streams. See FIG. 2D.

The transfer sheet may also be a thermal plastic or similar material such as GORE-TEX which has porosity that allows transfer of water vapor molecules and the material transfers temperature across its own thermal mass. See FIG. 2A.

The invention may include a layer of desiccant material on one of the sides of the layers with or without a heating element that permanently regenerates the desiccant material and always induces the travel of moisture in one direction. See FIG. 2B.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved energy transfer property system for transferring thermal and moisture properties between a first flow of air and a second flow of air, the first and second flows of air having different thermal and moisture properties, the transfer system comprising, in combination:

a plurality of spacer components in a stacked relationship including a plurality of first spacer components defining a first path of travel for the first flow and a plurality of second spacer components defining a second path of travel for the second flow, the first and second spacer components being stacked in an alternating relationship and separating the first flow and the second flow with such first and second flow being of different physical conditions;

a thermoplastic elastomer formed as a membrane or sheet with absorptive capacity which diffuses fluids passing there through located between each of the spacer components and adapted to transfer heat there through from the warmer to the cooler flow and to transfer moisture there through from the moister to the drier fluid by absorbing, diffusing and desorbing; and a heat exchanger media having a desiccant layer on a common side thereof.

2. A property transfer assembly for transferring properties from a first flowing fluid to a second flowing fluid comprising at least one spacer component defining a path of travel for the first flow and a second path of travel for the second flow, the spacer component including a transfer sheet located between the first path of travel and the second path of travel and adapted to transfer (a) heat therethrough from the first flowing fluid to the second flowing fluid if the first flowing fluid is warmer than the second flowing fluid or from the second flowing fluid to the first flowing fluid if the second flowing fluid is warmer than the first flowing fluid and to transfer (b) moisture therethrough from the first flowing fluid to the second flowing fluid if the first flowing fluid is more moist than the second flowing fluid or from the second flowing fluid to the first flowing fluid if the second flowing fluid is more moist than the first flowing fluid.

3. The apparatus as set forth in claim 2 and further including a desiccant layer on the transfer sheet.

4. The assembly as set forth in claim 3 and further including a heater in the flow of fluid on the side thereof facing the desiccant layer and in advance thereof.

5. A property transfer assembly for transferring properties from a first flowing fluid to a second flowing fluid comprising:

a plurality of spacer components in a stacked relationship including at least one first spacer component defining a first path of travel for the first flow and at least one second spacer component defining a second path of travel for the second flow, the first and second spacer components being separated in a spaced relationship; and a transfer sheet of an engineering thermoplastic elastomer located between the spacer components and adapted to transfer (a) heat therethrough from the first flowing fluid to the second flowing fluid if the first flowing fluid is warmer than the second flowing fluid or from the second flowing fluid to the first flowing fluid if the second flowing fluid is warmer than the first flowing fluid and to transfer (b) moisture therethrough from the first flowing fluid to the second flowing fluid if the first flowing fluid is more moist than the second flowing fluid or from the second flowing fluid to the first flowing fluid if the second flowing fluid is more moist than the first flowing fluid by absorbing, diffusing and desorbing.

6. The transfer assembly as set forth in claim 5 wherein the spacer components are sinusoidal in shape.

7. The transfer assembly as set forth in claim 5 wherein the spacer components are triangular-in shape.

8. The transfer assembly as set forth in claim 5 wherein the spacer components are rhomboidal in shape.

9. The transfer assembly as set forth in claim 5 wherein the spacer components are sawtooth in shape.

10. The transfer assembly as set forth in claim 5 wherein the spacer components are finger-shaped.

11. The transfer assembly as set forth in claim 5 wherein the spacer components are shaped as cylindrical tubes.

12. The transfer assembly as set forth in claim 5 wherein the spacer components are hemispherical in shape.

13. The transfer assembly as set forth in claim 5 and further including a supplemental property transfer assembly with a common recirculating fluid flow path between the two assemblies for one of the fluid flows.

14. The transfer assembly as set forth in claim 13 wherein at least one of the property transfer assemblies is located in a closed thermal treatment space.

15. The transfer assembly as set forth in claim 14 wherein the closed thermal treatment space includes a generator selected from the class of generators including convention heat, radio frequency, ultrasound or microwave.

16. The transfer assembly as set forth in claim 13 wherein one of the property transfer assemblies is for the transfer of enthalpy and the other is for the transfer of latent.

17. The transfer assembly as set forth in claim 13 wherein one of the property transfer assemblies is for transfer of desiccant and the other is for transfer of sensible.

18. The transfer assembly as set forth in claim 13 wherein the property transfer assemblies are located in sequence.

19. The transfer assembly as set forth in claim 5 wherein the transfer sheet is folded back and forth upon itself in sequence to provide oppositely-facing enclosed spaces and with sinusoidal sheets within each enclosed space for directing the flow of fluid there through.

20. The transfer assembly as set forth in claim 5 wherein the transfer sheet is in the form of tubes with one flow of fluid through the tubes and the other flow of fluid across the tubes.

21. The transfer assembly as set forth in claim 20 and further including a desiccant layer on one surface of the tubes.

22. The transfer assembly as set forth in claim 5 and further including an associated air conditioning system.

* * * * *